United States Patent [19]

Ugo

[11] Patent Number: 4,736,546
[45] Date of Patent: Apr. 12, 1988

[54] TIRE UNIFORMITY GRINDER AND METHOD

[76] Inventor: John W. Ugo, 3969 Norbert, Warren, Mich. 48091

[21] Appl. No.: 856,447

[22] Filed: Apr. 23, 1986

Related U.S. Application Data

[63] Continuation of Ser. No. 510,470, Jul. 1, 1983, abandoned.

[51] Int. Cl.$^4$ ................................................ B24B 5/36
[52] U.S. Cl. ................................ 51/106 A; 51/165 R
[58] Field of Search ...................................... 51/289 R

[56] References Cited

U.S. PATENT DOCUMENTS

| | | | |
|---|---|---|---|
| 3,550,442 | 12/1970 | Carr et al. | 73/146 |
| 3,553,903 | 1/1971 | Christie | 51/165 |
| 3,719,813 | 3/1973 | Friedman et al. | 235/151.31 |
| 3,739,533 | 6/1973 | Iida | 51/281 R |
| 3,841,033 | 10/1974 | Appleby et al. | 51/289 R |
| 3,845,533 | 11/1974 | Tinfow et al. | 29/90 R |
| 3,914,907 | 10/1975 | Hofelt, Jr. et al. | 51/281 R |
| 3,932,965 | 1/1976 | Kline, Jr. | 51/281 |
| 3,935,676 | 2/1976 | Kline, Jr. et al. | 51/106 R |
| 3,946,527 | 3/1976 | Beer | 51/281 R |
| 3,963,427 | 6/1976 | Ugo | 51/281 R |
| 3,977,131 | 8/1976 | Searle et al. | 51/289 R |

FOREIGN PATENT DOCUMENTS

| | | | |
|---|---|---|---|
| 87351 | 5/1982 | Japan | 51/106 R |

*Primary Examiner*—Harold D. Whitehead

[57] ABSTRACT

The apparatus for improving tire uniformity includes contra-rotating grinding wheels for removing tire material from the upper and lower shoulder portions of the tire. The grinders are moved into grinding engagement with the tire along a path that is defined by a radius of the tire to ensure that both grinding wheels at each shoulder of the tire make simultaneous contact with the tire. The amount and extent of grinding accomplished by the contra-rotating grinders is controlled by a grind control circuit. The grind control circuit measures the no-lead current level of the grinder motor and compares the no-load current level with the current level when the grinder motors are under load. When the grinder current under load is above a predetermined maximum load current, the control circuit will signal the grinders to retract from engagement with the tire until the load current drops below the predetermined maximum level. When the motor load current is below the minimum operating range level, the grinders are signalled to advance into engagement with the tire until the load current reaches the predetermined minimum level. This operation is repeated in cyclic fashion until the tire has been ground a sufficient amount to bring it within an acceptable correction range. An alarm circuit which cooperates with the grind control circuit assures that once a grinding operation is begun it will have a predetermined minimum time duration. The alarm circuit also detects whether one of the shoulder grinders takes too long to engage the tire after the other shoulder grinder has made such engagement. The alarm circuit will stop the grinding operation if too long a period of time has elapsed and if there are other malfunctions of the grinders.

15 Claims, 17 Drawing Sheets

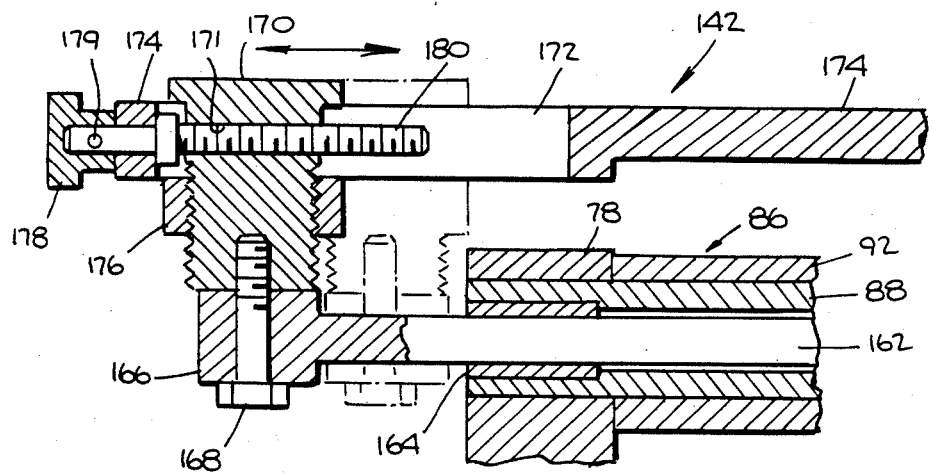
Fig. 12.
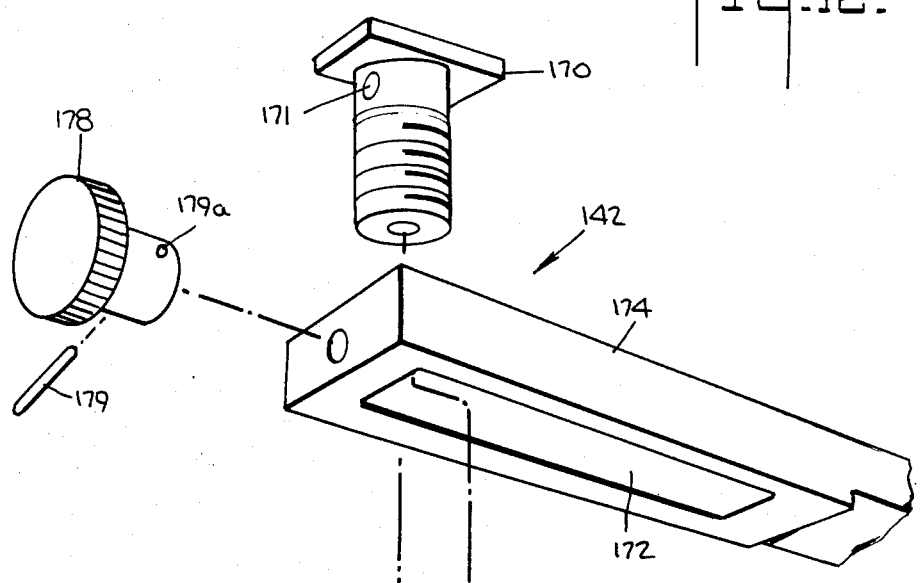
Fig. 13.
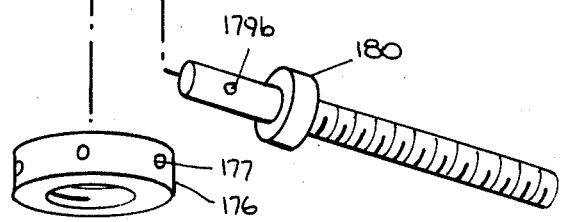

TIRE UNIFORMITY GRINDER AND METHOD

This is a continuation of application Ser. No. 510,470, filed Jul. 1, 1983, and now abandoned.

BACKGROUND OF THE INVENTION

This invention relates to an apparatus and method for improving the uniformity of pneumatic tires and to associated circuitry for controlling the apparatus.

The problem of tire non-uniformities has long been recognized by tire manufacturers and vehicle owners, and efforts to deal with such non-uniformities represent a significant part of the tire manufacturing process. The term tire non-uniformities generally refers to eccentricity of the tire, or free radial runout, wherein the tire periphery deviates from that of a perfect circle. The term tire non-uniformity also generally refers to radial force variations wherein the forces that are exerted radially between the tire and the road surface, under normal load, vary as the tire rolls along such surface. Other variables, not relevant to this discussion, are also included in the term non-uniformity.

A vehicle with one or more tires having the aforesaid non-uniformities usually provides a ride that is characterized by pumpiness, vibrations and noise. Since such conditions are uncomfortable and often exasperating, most tire manufacturers inspect or measure their tires for non-uniformities of the type described. Examples of methods and apparatus used in measuring such non-uniformities are disclosed in U.S. Pat. Nos. 3,550,442 and 3,719,813, which are assigned to the assignee of the present invention.

It has been found that minor non-uniformities of the type described do not provide an objectionable ride quality and do not adversely affect the wear of the tire to any great extent. Therefore, a tire is usually considered acceptable if it has non-uniformities that measure within a predetermined acceptable range. However, once the non-uniformity measurements fall outside the acceptable range, the cured tire is usually reworked in an apparatus for correcting such non-uniformities, generally known as a tire uniformity optimizer, hereinafter also referred to as a TUO A TUO machine usually includes one or more grinding devices that remove tire material from a circumferential portion of the tread in a uniform circumferential band. Known TUO machines, as shown in U.S. Pat. Nos. 3,550,442 and 3,719,813, also perform non-uniformity measurements that precede the corrective grinding treatment of the tire. For example, such TUO machines include a wheel and axle assembly on which the tire to be evaluated is mounted, and also a test or load wheel that contacts the tire. The tire is forcibly held against the load wheel to apply a predetermined load on the tire. As the tire is rotated with the load wheel, the variation in radial force on the tire axle is measured. If the radial force variation is outside a specified acceptance range, some portion of the tread surface of the tire will usually be ground to modify or reduce the radial force variation.

A tire with non-uniformity measurements that are slightly outside the acceptance range will normally be ground only a slight amount. However a slight grinding of the tire often provides the tire periphery, at the tire shoulder for example, with an erratic surface appearance because the grinding is not extensive enough to remove sufficient material from the tire shoulder to esthetically blend the ground portions with the unground portions of the tire shoulder. The grinding pattern is thus irregular, which detracts from the appearance and marketability of the tire, even though the irregularly ground tire will provide a better ride quality than an unground, uncorrected tire which does not have an irregular appearance.

Known tire grinders such as shown in U.S. Pat. Nos. 3,963,427, 3,946,527, 3,935,676, 3,932,965, 3,914,907 and 3,841,033 treat a particular circumferential band of the tire by grinding in one direction only. Tires with tread patterns that extend axially (transversely) of the tire, rather than circumferentially thereof, such as all weather tires, snow tires, and mud and snow tires, have tread lugs or blocks that usually buckle or shift in the direction of rotation of the grind wheel when being ground. The tread lugs or blocks thus exhibit a shingled effect wherein the depth of grind varies on each tread lug or tread block over a circumferential hand of the tire. Thus, while a grinding treatment wherein the tire is ground in one direction furnishes some correction to radial force variations, the resulting shingled effect on tires with axially extending tread patterns increases the noise level of such tires and adversely affects the smoothness of ride.

It is thus desirable to provide a TUO machine and method that will uniformly grind a tread lug of a tire. It is also desirable to provide a TUO machine and method which automatically furnishes a generally uniform grinding pattern to a circumferential band of a tire without deleteriously affecting the uniformity of the tire even though the grind correction required by the tire would normally furnish the tire with an irregular grinding pattern.

OBJECTS AND SUMMARY OF THE INVENTION

Among the several objects of the invention may be noted the provision of an improved tire uniformity optimizer (TUO) apparatus for correcting non-uniformities in a tire, a novel TUO apparatus having multiple contra-rotating grinding wheels to uniformly finish circumferential portions of the tread surface of a cured tire, a TUO apparatus having novel means for moving the contra-rotating grinding wheels against a tire surface along a path defined by a radius of the tire being ground, a novel TUO apparatus having novel means for moving the contra-rotating grinding wheels against a tire surface such that each of the contra-rotating grinding wheels makes simultaneous grinding contact with the tire surface, a novel grind control circuit for a TUO apparatus, a novel alarm system for assuring that a uniform grind pattern on the tire is achieved, a novel alarm system for shutting down the grinding operation if two multiple contra-rotating grinder assemblies do not make substantially simultaneous contact with the tire or if one of the two contra-rotating grinder assemblies malfunctions, and a novel method for correcting non-uniformities in a tire.

The present invention relates to an apparatus and method for correcting non-uniformities in a pneumatic tire. The apparatus employs contra-rotating grinding wheels for grinding a circumferential band portion of a tire at, for example, a lateral shoulder portion of the tire tread. The contra-rotating grinding wheels contact the surface of the tire at two angularly spaced portions of the circumferential band, the spacing depending upon the diameter of the grinding wheels and the distance between the grinding axes of the grinding wheels.

The contra-rotating grinding wheels are disposed in a grinder housing that is pivotally supported on a grinder arm. The grinder arm is, in turn, connected to a mounting arm that is pivoted to a frame post. Thus, the mounting arm, when pivoted toward or away from the tire, will move the grinder housing toward or away from the tire.

However, it is desirable that both of the contra-rotating grinding wheels make simultaneous contact with the tire when the grinding operation is begun so that one grinder wheel will not remove more tire material than the other grinder wheel. Thus, an attitude adjustment linkage is provided which interconnects the frame post of the TUO machine with the grinder housing to pivot the grinder housing relative to the grinder arm as the grinder arm pivots relative to the frame post. This complex movement of the grinder-housing directs the grinder wheels toward the tire on a path defined by a radius of the tire, assuring that both grinder wheels contact the tire simultaneously. A sensor on the grinder housing engages the tire just before the grinder wheels contact the tire to provide an electric signal for a grinder control circuit and an alarm circuit.

Another set of contra-rotating grinding wheels is employed at an opposite shoulder portion of the tire such that both shoulder regions of the tire tread are ground together. The contra-rotating grinding wheels at each shoulder of the tire provide bi-directional grinding to the surface of the tire that is ground. Thus, if a tread lug or block tends to buckle or shift when being ground in one direction, tending to cause a shingled effect, the next grinding wheel of the contra-rotating set moves across the surface in an opposite direction, obviating the formation of a shingled grind pattern. Consequently, the tire surface is more uniformly ground.

During grinding of the tire, the current drawn by the motor which powers the grinders and the load imposed upon the grinders have a relationship wherein the motor load current increases as the force of the grinders against the tire increases. This relationship between motor load current and grinding force is utilized to control how harshly the tire is ground.

A representation of the no-load current value for the grinder motor is measured and stored by an electronic control as a reference value. The electronic control provides a ramp signal to a servo amplifier based on a difference between the no-load motor current and the current under load, causing the grinder to advance to the tire. The grinders than begin grinding the tire to make the necessary uniformity corrections. The control circuit monitors the current being drawn by each of the grinder motors. The current drawn is then compared against predetermined maximum and minimum values. If the grinder current draw exceeds the maximum value the control circuit causes the grinder to retract from the tire to diminish the motor load. If the grinder current draw is less than the minimum, the control circuit causes the grinder to continue to advance against the tire. At all times the grinder motor current draw is precisely controlled, thereby controlling how harshly the tire is ground. If the grinders do not follow a normal mode of operation, the alarm portion of the control sends a signal indicating that a fault condition exists to thereby stop the operation of the TUO machine.

The alarm portion of the control circuit has two functions. One function is to detect that the contra-rotating grinding wheels at one shoulder of the tire come into contact with the tire within a prescribed minimum period of time after the contra-rotating grind wheels at the other shoulder of the tire make contact with the tire. The alarm circuit thus assures that grinding must take place at both shoulders substantially simultaneously or not at all.

The TUO machine, as is known, will normally send a signal to a control circuit to indicate when the correction to a tire has been completed to thereby terminate the grinding operation. However, if only a very small amount of grinding is needed to correct a non-uniformity of the tire, the tire will often have an erratic surface appearance that looks like a blemish. Therefore, the other function of the alarm circuit is to assure that at least a minimum amount of grind time will result before the contra-rotating grinding wheels stop the grinding operation. This minimum amount of grind time is intended to assure that a grind band of uniform width is imparted to the tire without deleteriously affecting the tire uniformity. Thus, the alarm circuit also functions to assure that the grinders will operate for a predetermined minimum amount of grind time once a grinding operation is begun.

While the specification concludes with claims particularly pointing out and distinctly claiming the subject matter regarded as this invention, it is believed that the invention will be better understood from the following description taken in conjuction with the accompanying drawings.

DESCRIPTION OF THE DRAWINGS

In the accompanying drawings,

FIG. 12 is a fragmentary sectional view of the attitude adjustment linkage in assembled condition;

FIG. 13 is an exploded perspective view of a slide adjustment portion of the attitude adjustment linkage;

Corresponding reference characters indicate corresponding parts throughout the several views of the drawings.

DETAILED DESCRIPTION OF THE INVENTION

Figure 1:
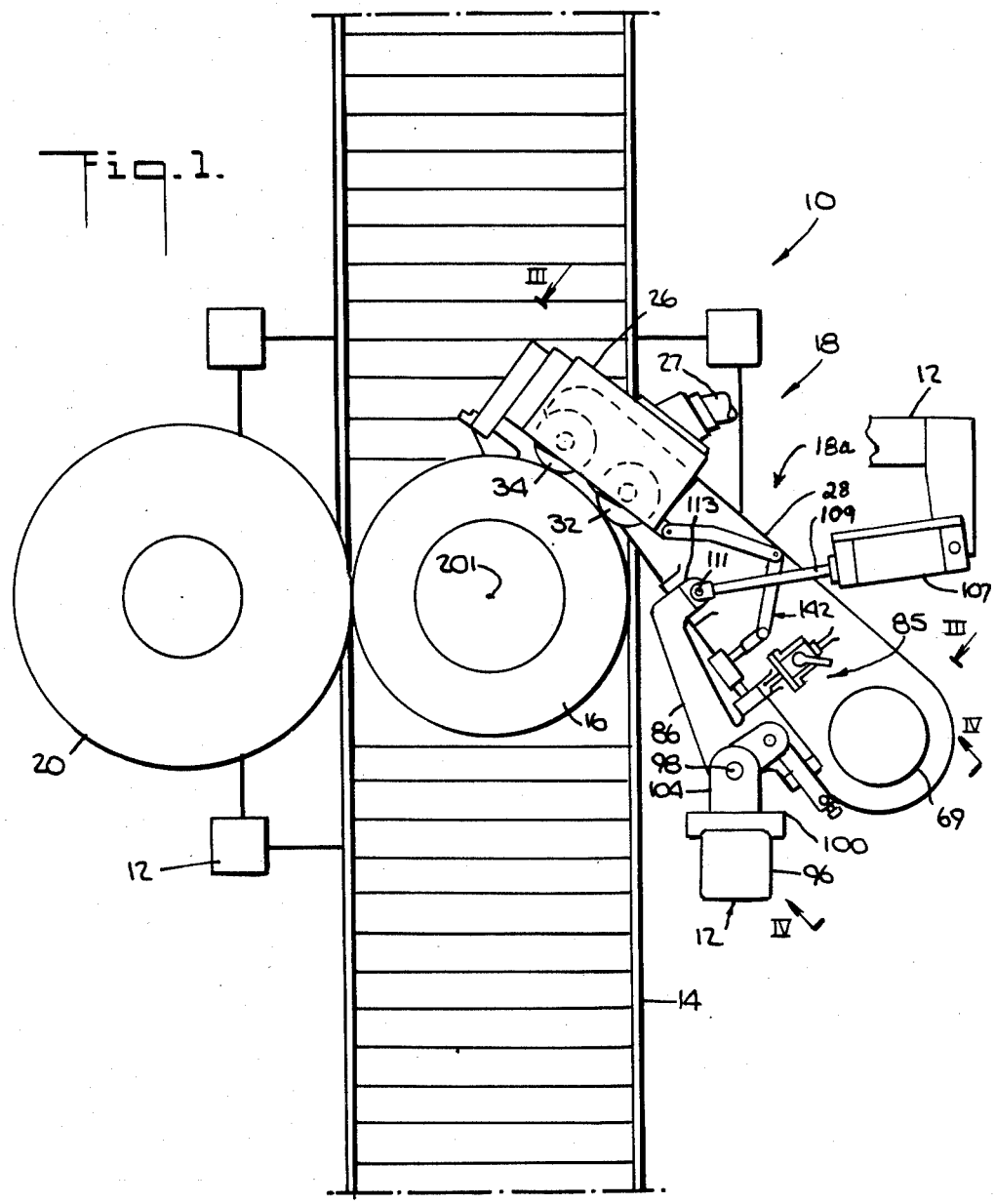
FIG. 1 is a simplified schematic plan view of a tire uniformity optimizer apparatus incorporation one embodiment of the present invention, with the upper shoulder grinder removed to expose details of the lower shoulder grinder.

Referring now to the drawings, a dual grinder tire uniformity optimizer apparatus is generally indicated by the reference number 10 in FIG. 1 and is hereinafter referred to as the TUO apparatus 10.

The TUO apparatus 10 comprises a frame 12, a conveyor system 14 for transporting an unmounted tire 16 into and out of range of a dual grinding assembly 18, and a load wheel 20 for rotating the tire 16 under load. The load wheel 20 cooperates with sensing means (not shown) for measuring the non-uniformity characteristics of the tire 16.

Figure 8:
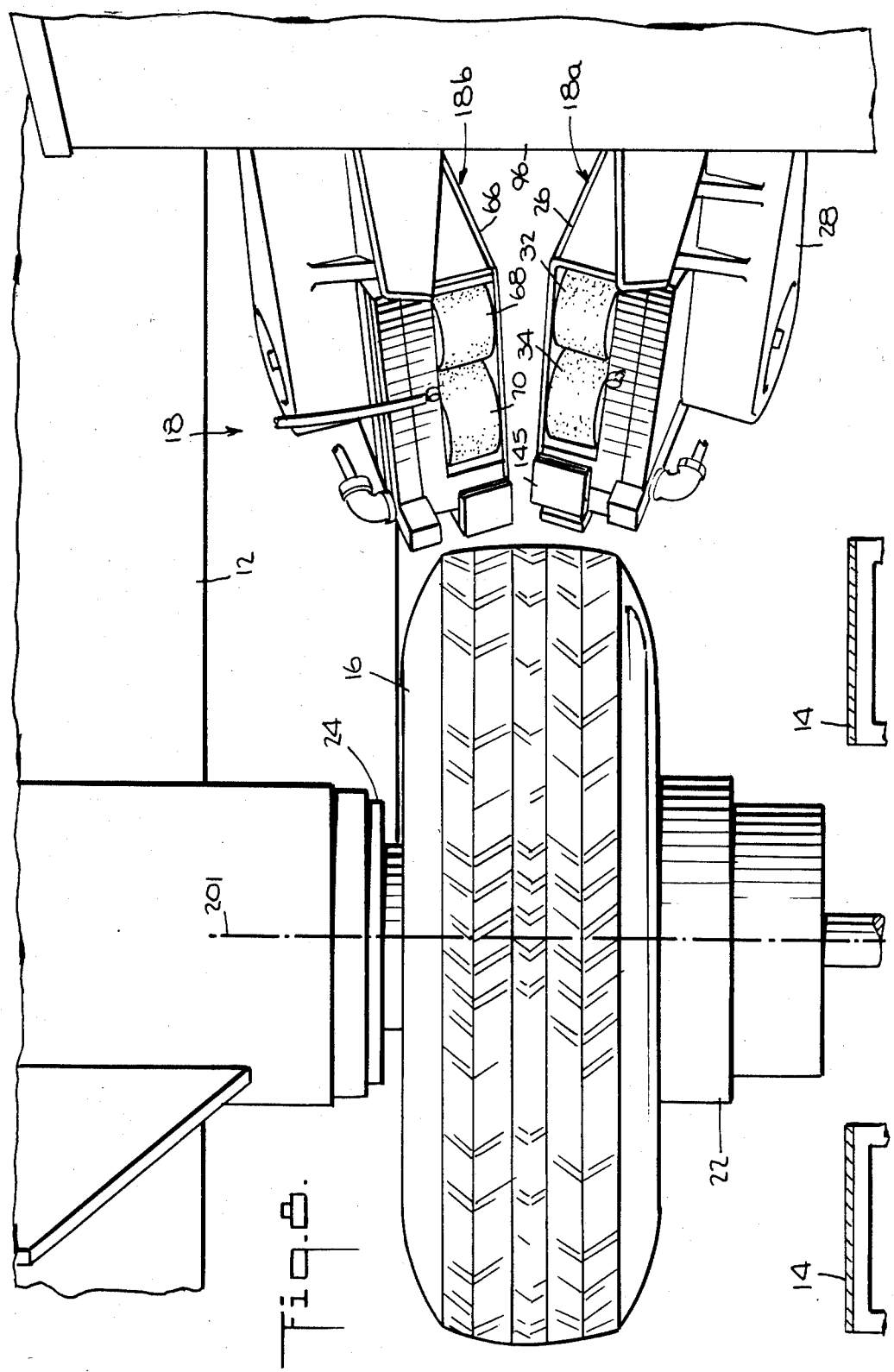
FIG. 8 is a simplified perspective view of the tire uniformity optimizer showing the upper and lower shoulder grinders of the tire uniformity apparatus in a retracted position, as viewed at a level intermediate the grinder assemblies from another point adjacent to the point at which the grinder assemblies are supported from the frame post.
Figure 9:
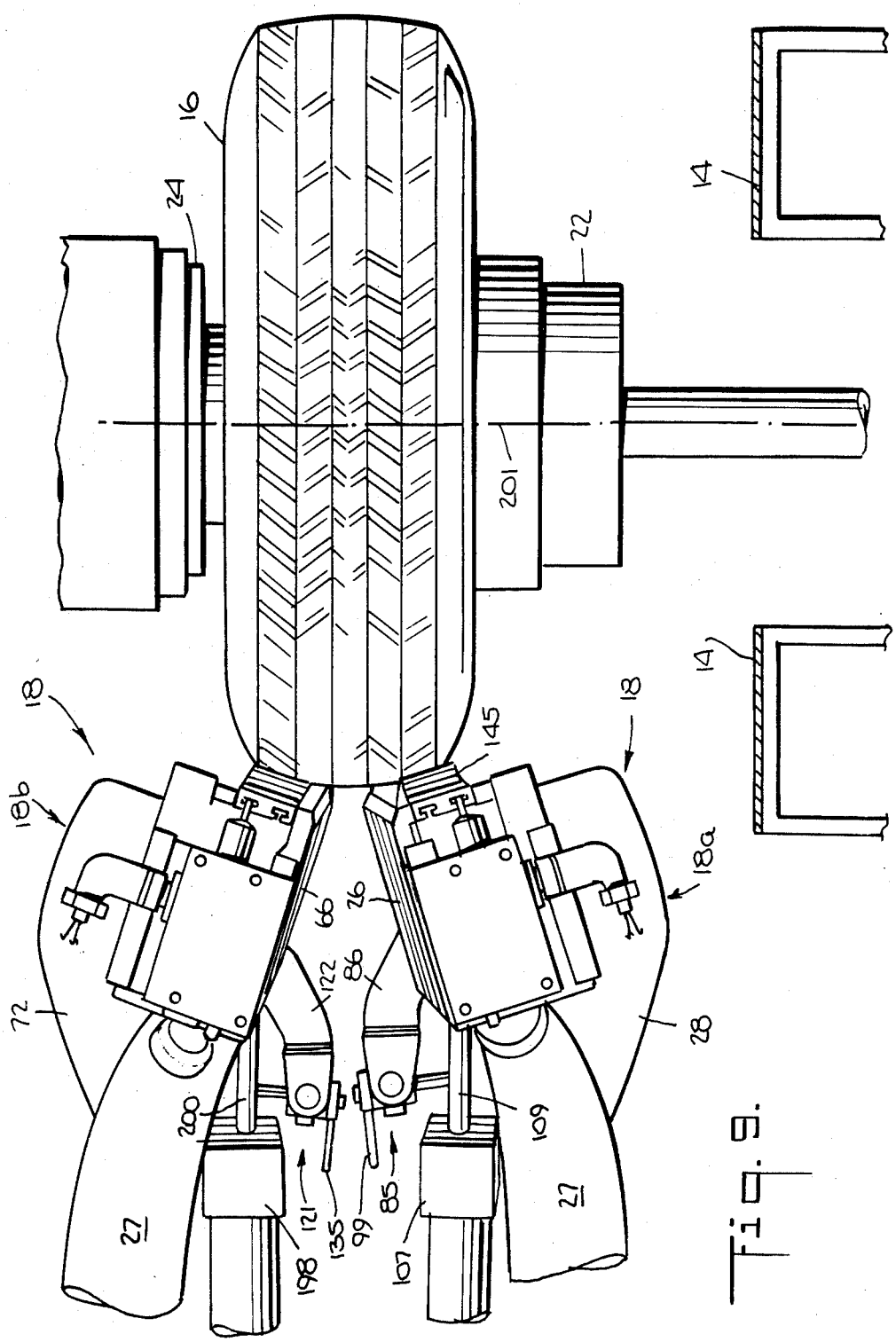
FIG. 9 is a simplified perspective view showing the upper and lower shoulder grinders in a grinding position, as viewed at a level intermediate the grinder assemblies from a point adjacent to the free end of the grinder arms.

The conveyor system 14, as shown in FIGS. 8 and 9, cooperates with a known retractable tire support means 22 that raises the tire 16 from the conveyor 14 when a tire 16 is positioned below a known spindle mount and inflation means 24. The tire 16 is thus inflated and mounted for rotation between the tire support means 22 and the spindle mount and inflation means 24 prior to being operated on by the grinding assembly 18.

As shown in FIGS. 3, 4 and 7–9, the dual grinding assembly 18 includes a lower grinding assembly 18a and an upper grinding assembly 18b, which lower and upper grinding assemblies are substantially mirror images of one another.

Figure 2:
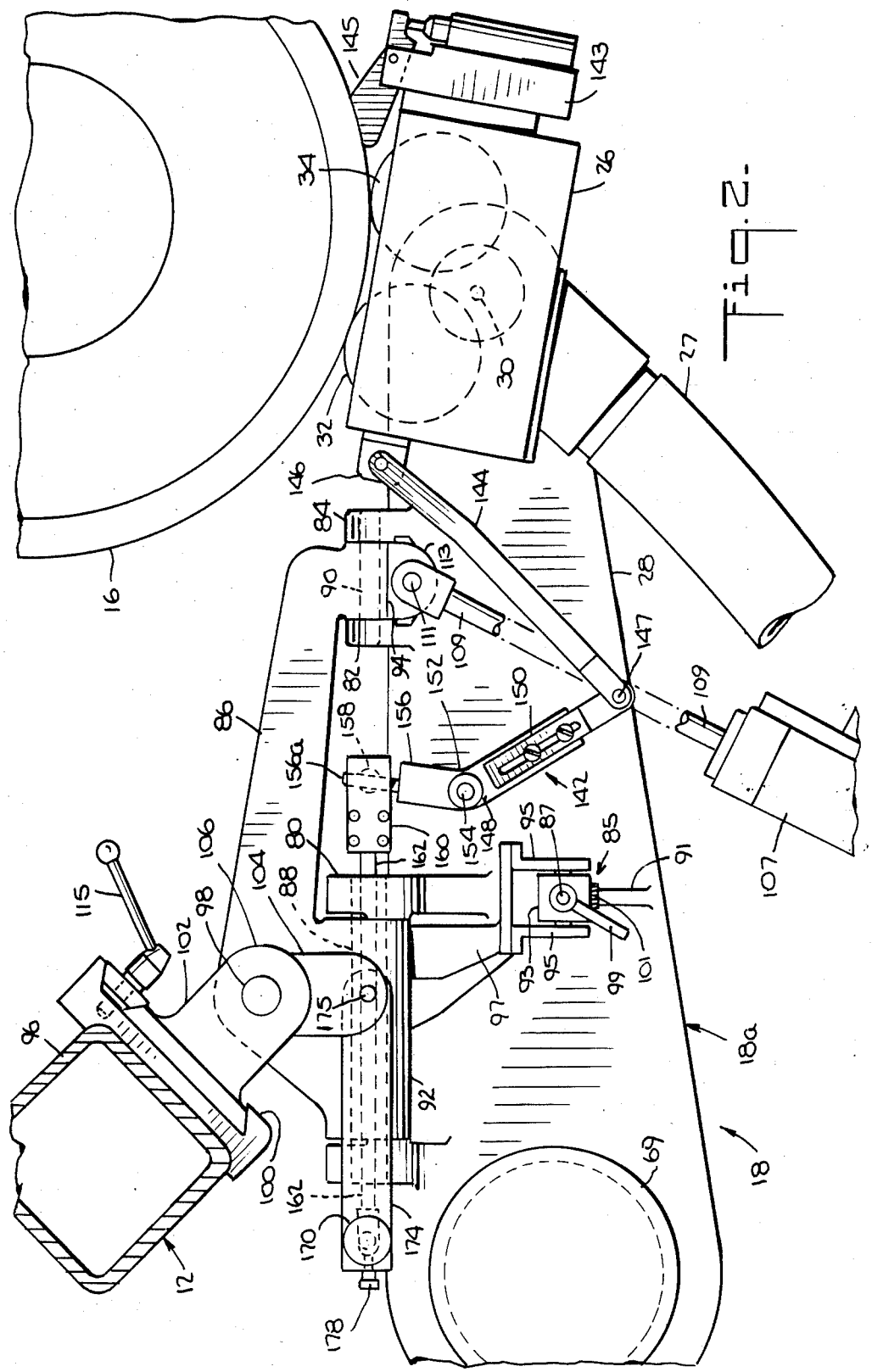
FIG. 2 is an enlarged fragmentary plan view of the lower shoulder grinder of FIG. 1.
Figure 3:
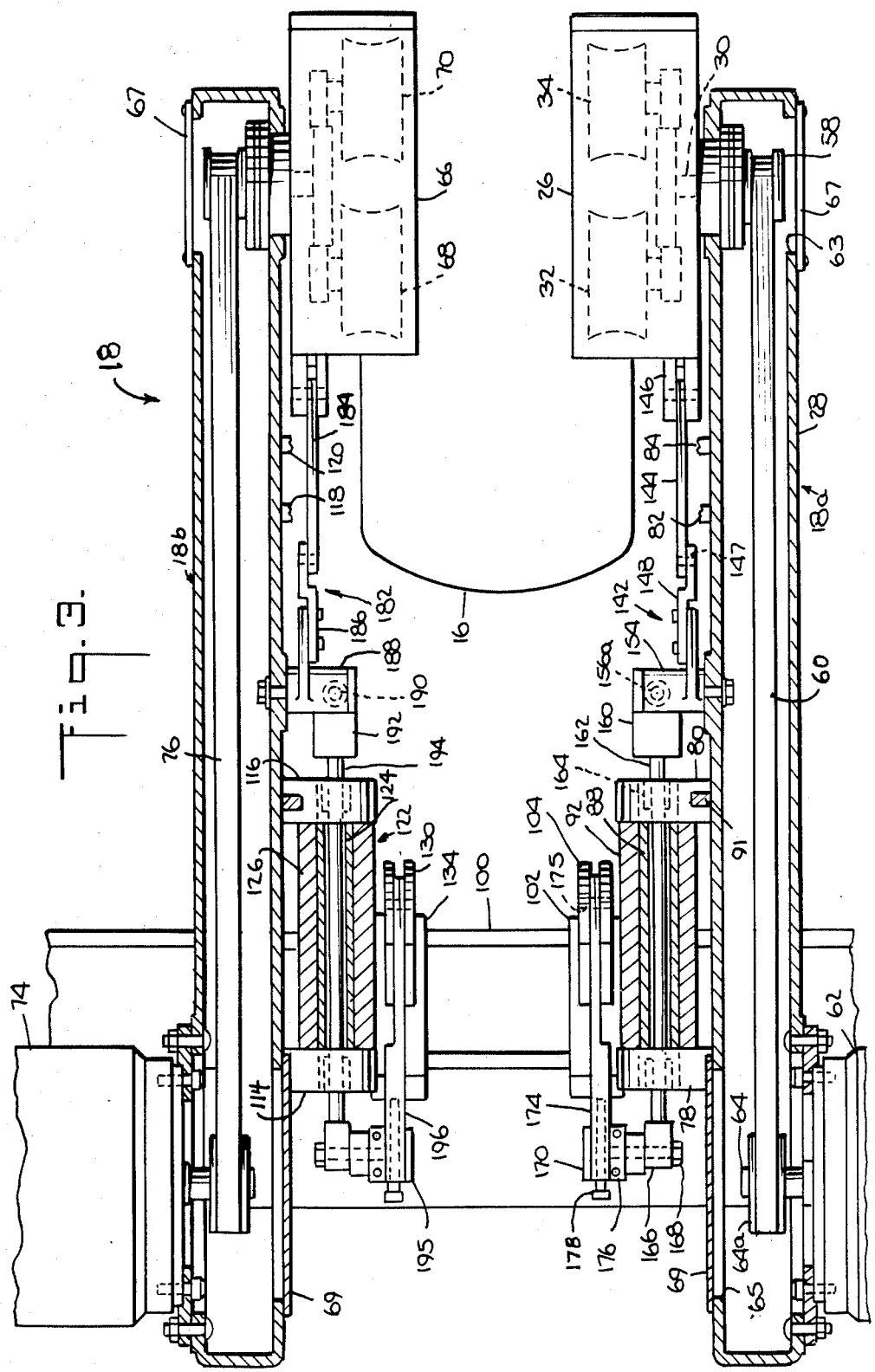
FIG. 3 is an enlarged side elevation view, with parts cut away for clarity, of the upper and lower shoulder grinders, taken along the line III—III of FIG. 1.
Figure 5:
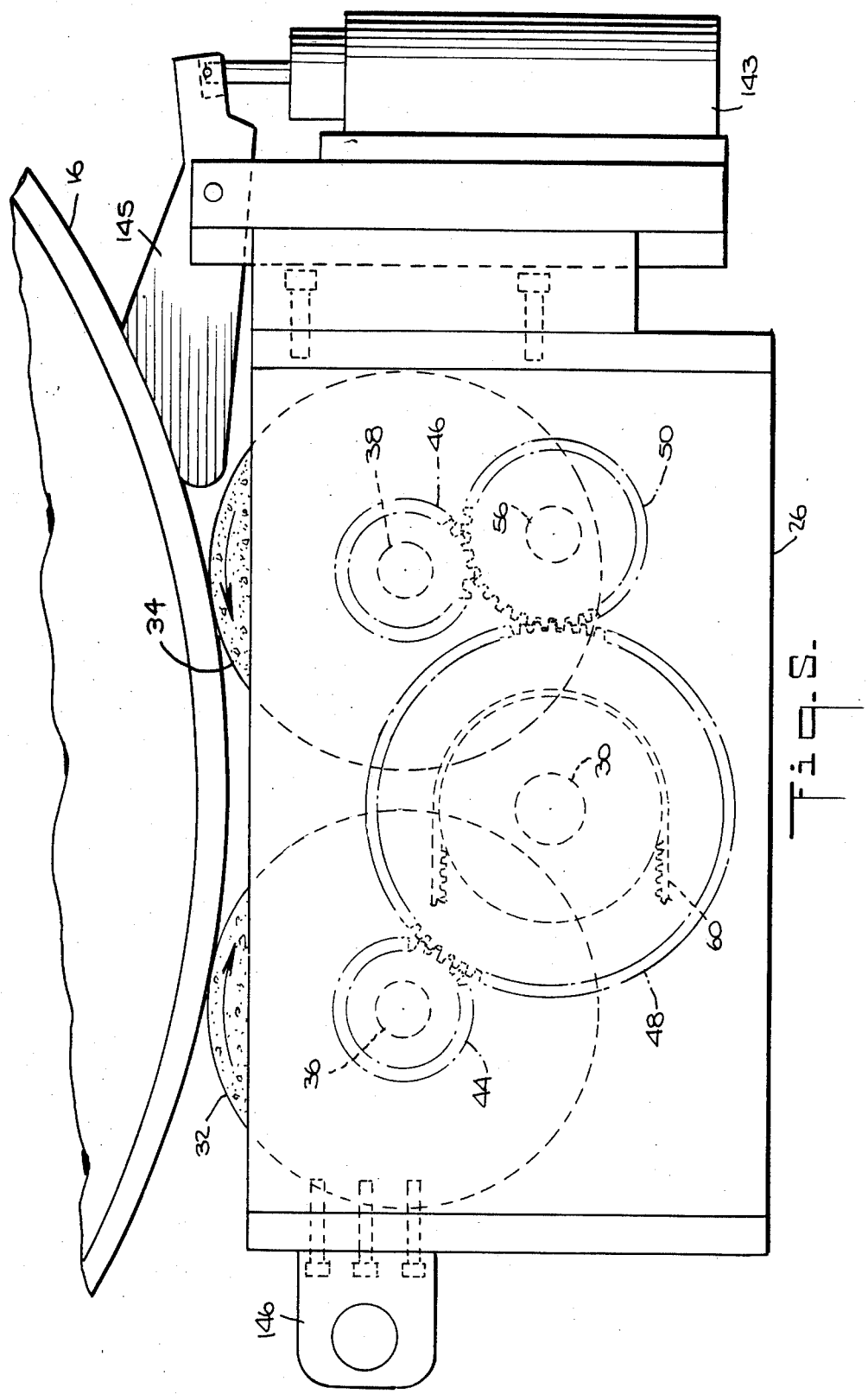
FIG. 5 is an enlarged plan view of the lower grinder housing.
Figure 6:
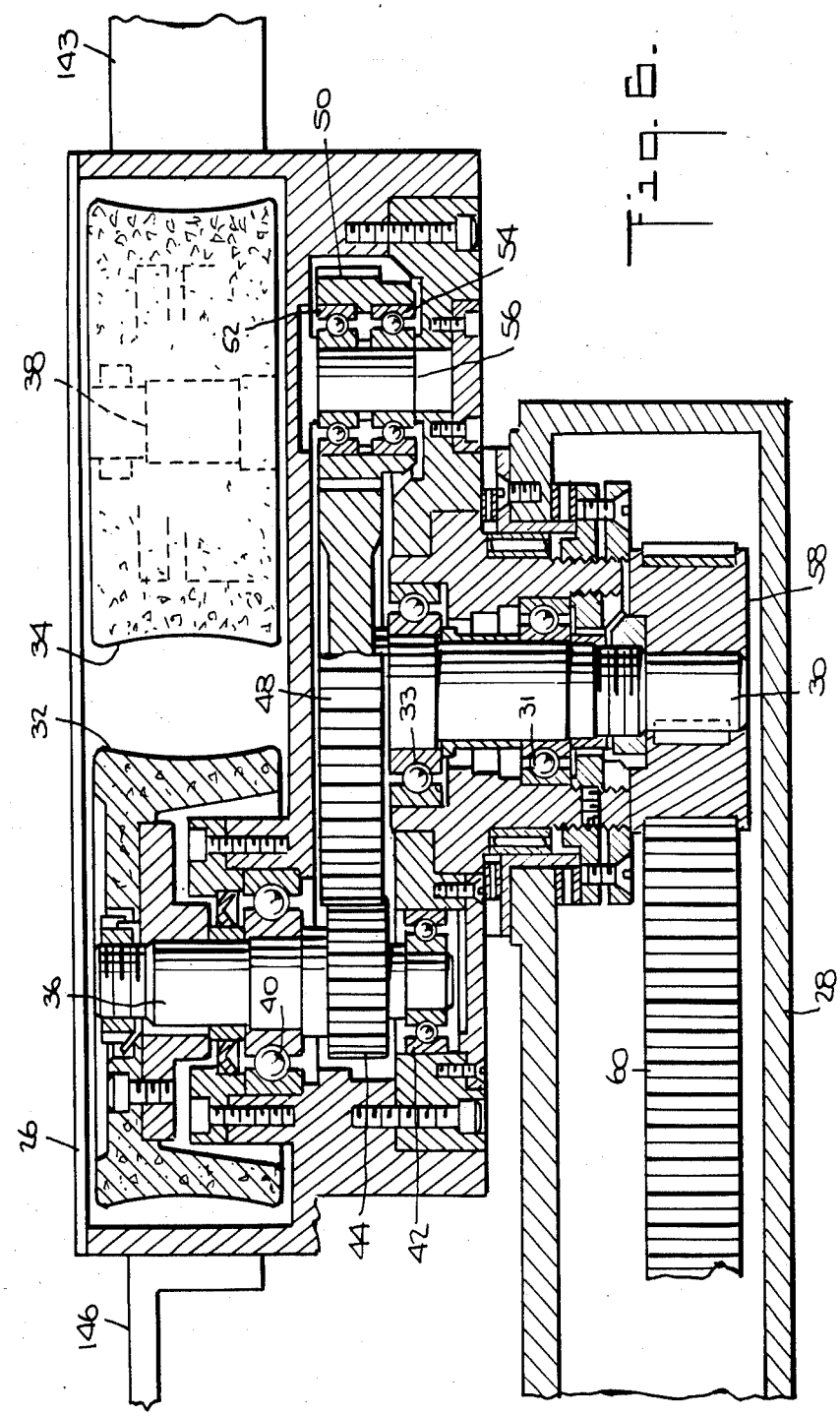
FIG. 6 is a partially sectional elevation view of the lower grinder housing of FIG. 5.
Figure 7:
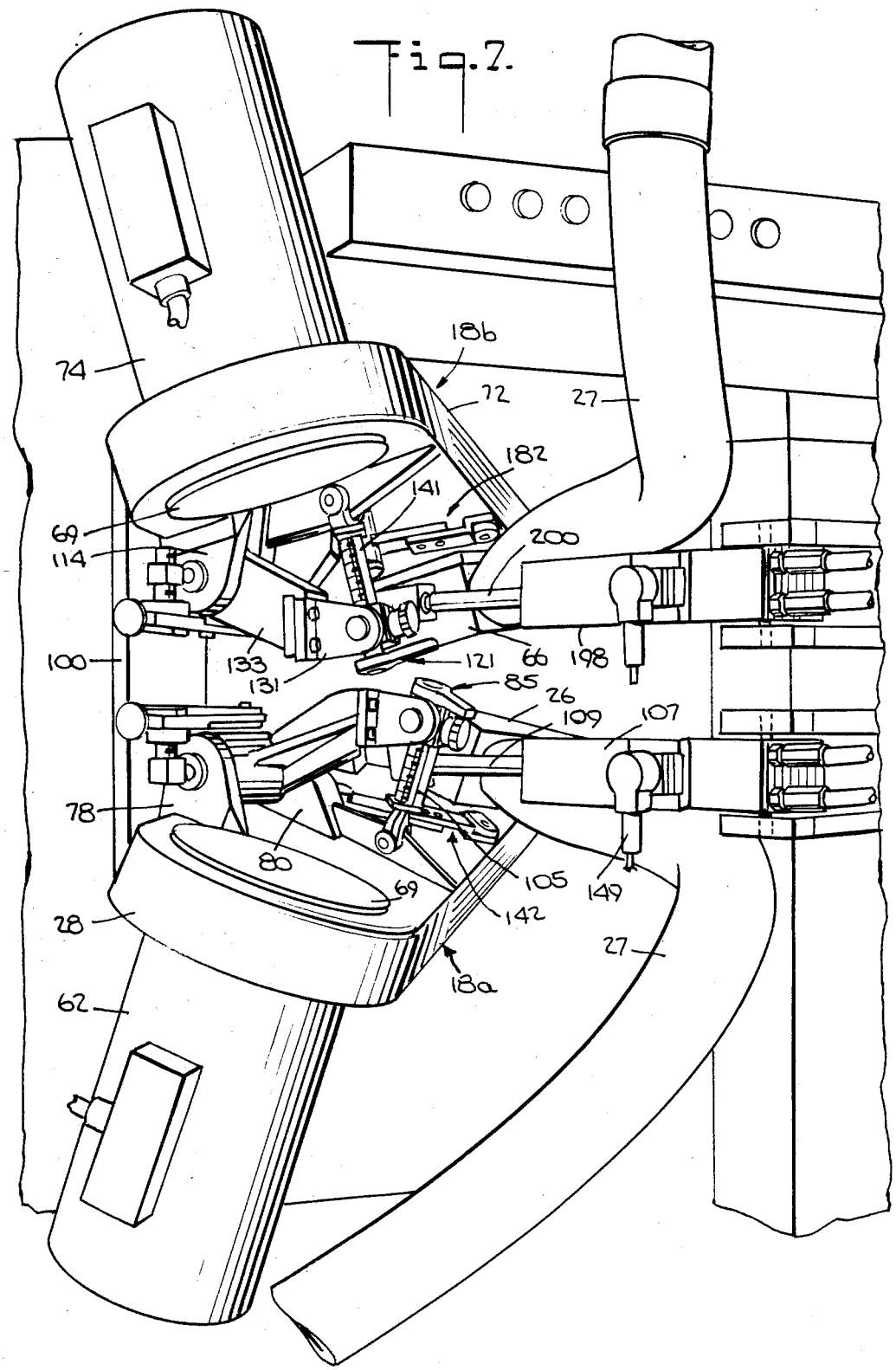
FIG. 7 is a simplified perspective view of the tire uniformity optimizer apparatus, as viewed at a level intermediate the grinder assemblies from a point adjacent to the point at which the mounting arms of the grinder assemblies are secured to one of the frame posts of the apparatus.

The lower grinding assembly 18a comprises a lower grinder housing 26 for grinding a lower shoulder of the tire 16, as viewed in FIG. 3. The grinder housing 26, which is provided with a vacuum hose 27 (FIGS. 1 and 2) for removing ground rubber during operation of the grinder, is supported on an elongated hollow grinder arm 28 and is pivotable about a shaft 30 (FIGS. 3, 5 and 6) that extends from the grinder housing 26 into the grinder arm 28. The shaft 30 is rotatable in bearings such as bearings 31 and 33.

The grinder housing 26 includes a pair of grinding wheels 32 and 34 respectively affixed to shafts 36 and 38 that are rotatable in bearings such as the bearings 40 and 42 associated with shaft 36. A pinion gear 44 is affixed to the shaft 36 and an identical pinion gear 46 is affixed to the shaft 38. The pinion gear 44 engages a drive gear 48 affixed to the shaft 30, while the pinion gear 46 engages an idler gear 50 that meshes with the drive gear 48. The idler gear 50 is rotatable on bearings 52 and 54 that surround a stationary shaft 56. Under this arrangement of gears 44, 46, 48 and 50, the grinding wheels 32 and 34 will contra-rotate, i.e., rotate in opposite directions.

A toothed pulley 58 is affixed to a free end of the shaft 30 that extends into the grinder arm 28. The pulley 58 engages a toothed belt 60 that is driven by a motor 62 supported on the grinder arm 28. The motor 62 includes a shaft 64 with a toothed pulley 64a affixed thereon for engaging the belt 60. Openings 63 and 65 are provided at opposite end portions of the grinder arm 28 for access to the respective pulleys 58 and 64a. Removable cover pieces 67 and 69 close off the respective openings 63 and 65.

The upper grinding assembly 18b, similarly, comprises an upper grinder housing 66 having grinding wheels 68 and 70 thereon for grinding an upper shoulder of the tire 16, as viewed in FIG. 3. The upper grinder housing 66 is supported on an elongated hollow grinder arm 72 which also supports a motor 74 for driving the grinding wheels 68 and 70 via a belt 76. The upper grinder housing 66 and the grinder arm 72 are symmetrical to and operationally identical to the lower grinder housing 26 and the grinder arm 28. Therefore, the description, although generally referring to the lower grinding assembly 18a for grinding the lower shoulder of the tire 16, as viewed in FIG. 3, is likewise applicable to the upper grinding assembly 18b, including the upper grinding housing 66 and the grinder arm 72, for grinding the upper shoulder of the tire 16.

Figure 4:
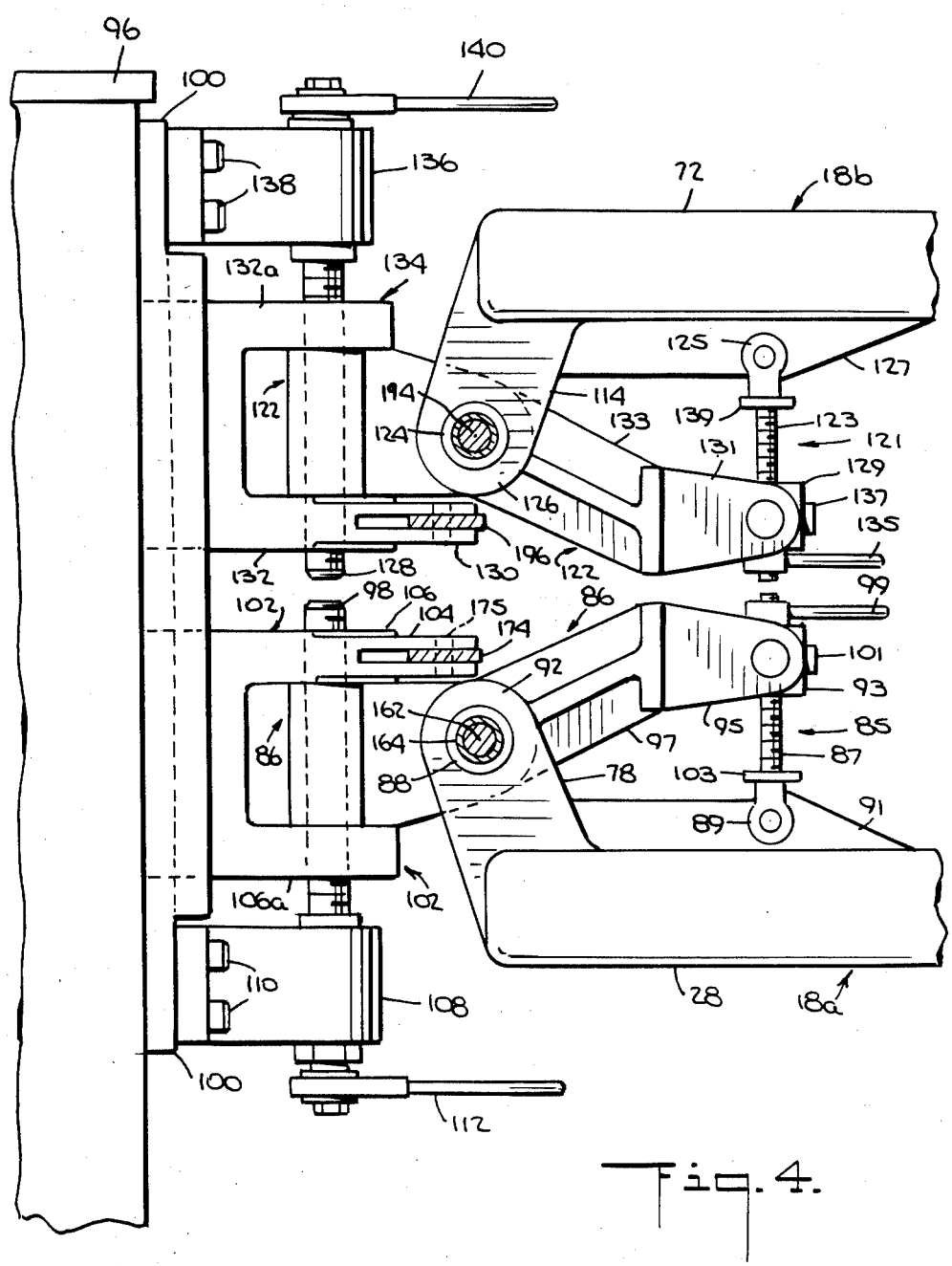
FIG. 4 is an enlarged end elevation view, with portions of the apparatus removed for purposes of clarity, of the upper and lower shoulder grinders, taken along the line IV—IV of FIG. 1.

Referring to FIGS. 2, 3 and 4, the grinder arm 28 is formed with a first pair of spaced ears 78 and 80 and a second pair of spaced ears 82 and 84, both of which pairs of ears connect with a mounting arm 86 in a manner that permits pivotal movement of the grinder arm 28 relative to the mounting arm 86. A pivot sleeve 88 is arranged between the ears 78 and 80, and a pivot shaft 90 is arranged between the ears 82 and 84. A first collar portion 92 of the mounting arm 86 embraces the pivot sleeve 88 and a second collar portion 94 of the mounting arm 86 embraces the pivot shaft 90. The pivot axis of the grinder arm 28 relative to the mounting arm 86 is thus defined by the pivot sleeve 88 and the pivot shaft 90.

Figure 10:
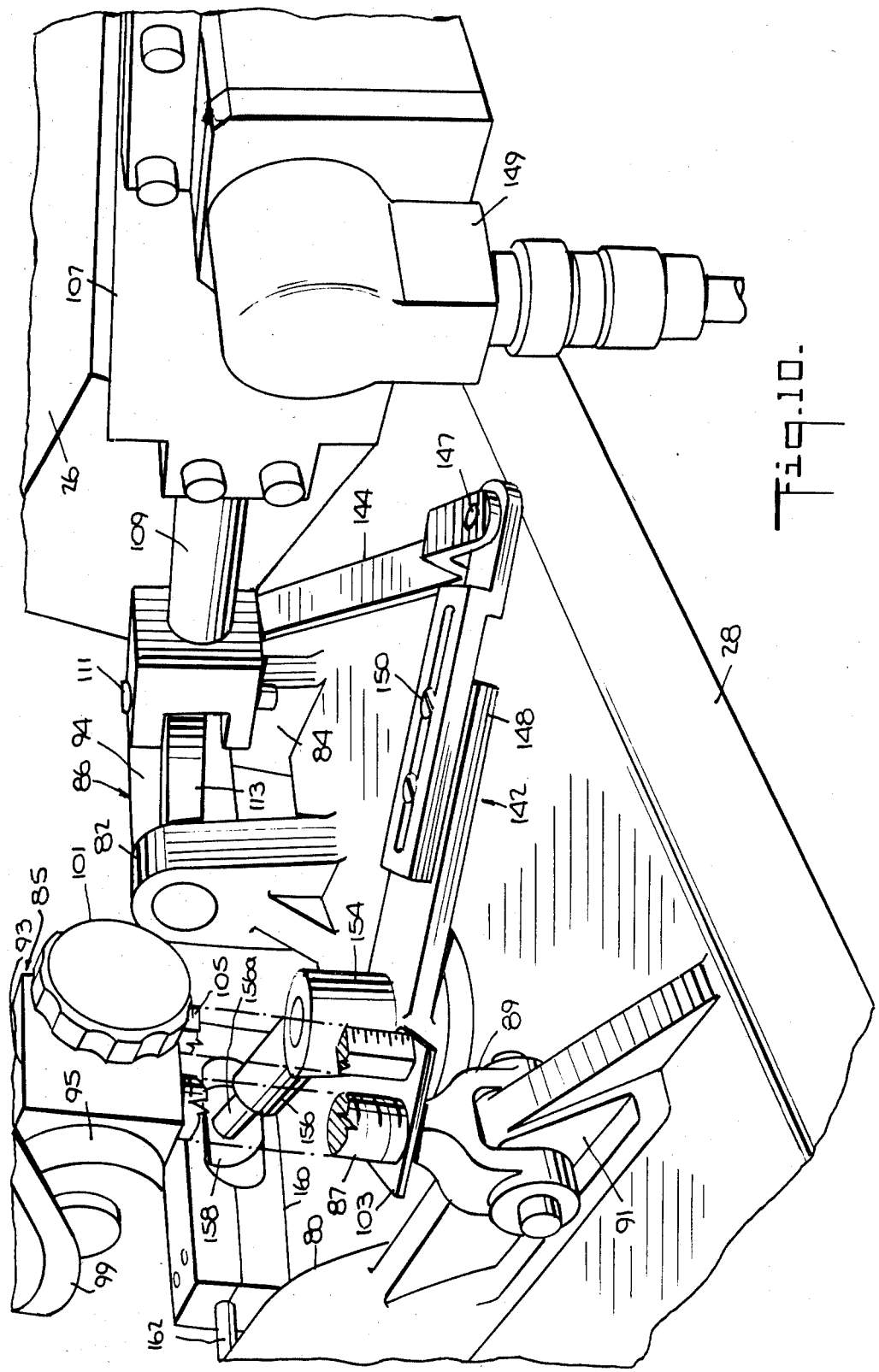
FIG. 10 is an enlarged fragmentary perspective view of part of the upper surface of the lower grinder assembly, showing portions of a tilt adjustment assembly and an attitude adjustment linkage thereon.
Figure 11:
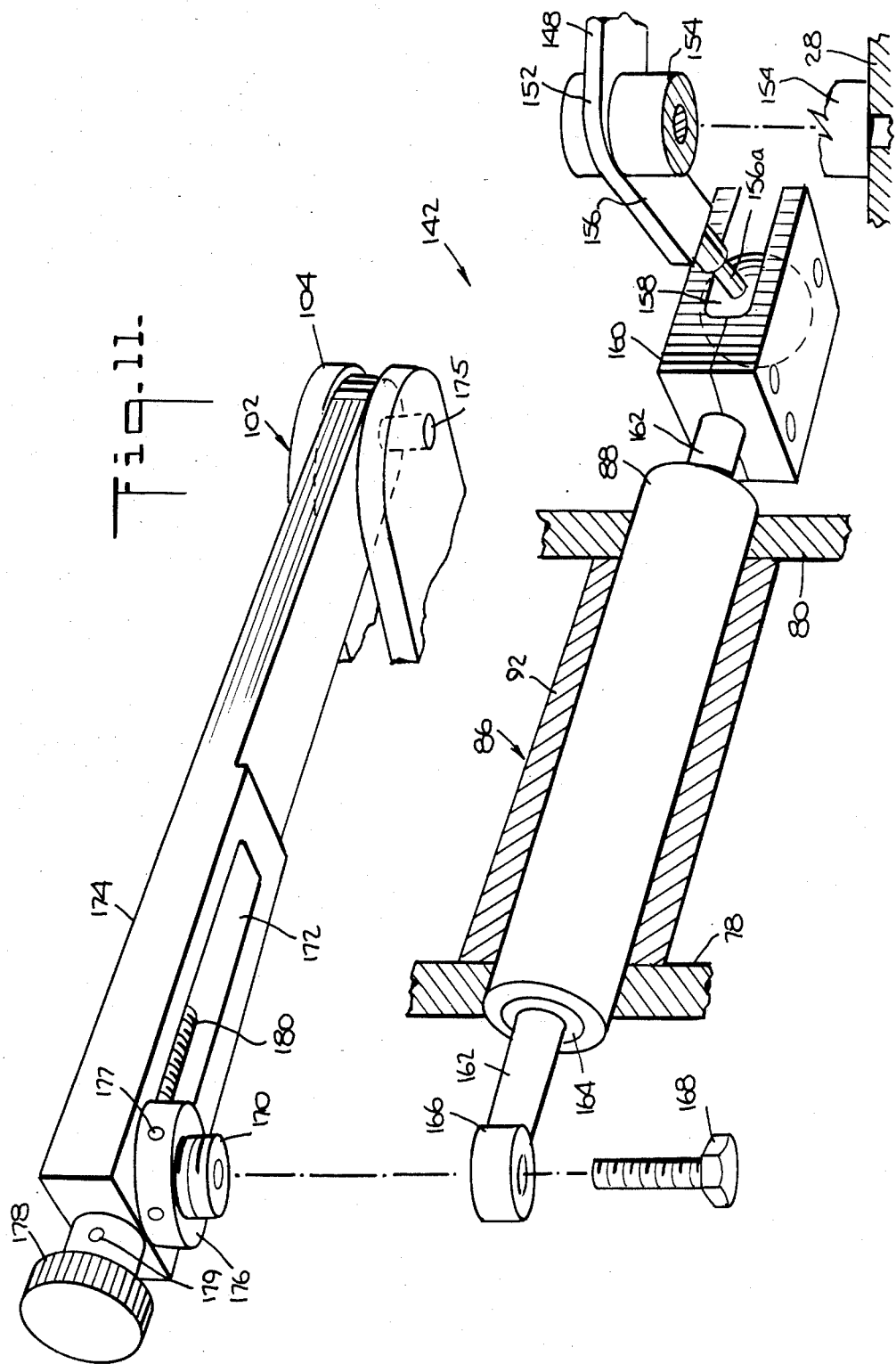
FIG. 11 is an exploded perspective view of another portion of the attitude adjustment linkage of the lower grinder assembly.

Pivotal movement of the grinder arm 28 relative to the mounting arm 86 is controlled by a tilt adjuster means 85 (FIGS. 2, 4 and 10) comprising a threaded link member 87 having a clevis end portion 89 pivoted to a web 91 formed on the grinder arm 28. The web 91, if desired, can extend from the ear 80, as shown in FIG. 10.

The link member 87 passes through a block 93 that is pivoted to a clevis 95 welded or otherwise fastened to a projection 97 (FIG. 2) fixed to and extending from the first collar portion 92 of the mounting arm 86. A control handle 99, threaded onto an end of the link member 87 above the block 93, can be manually rotated to control the distance between the block 93 and the grinder arm 28. Since the grinder arm 28 is pivoted to the mounting arm 86 between the ears 78, 80 and 82, 84, the control handle 99 controls the tilt angle of the grinder arm 28.

A lock knob 101 on the block 93 may be rotated to bear against the link member 87 to lock the position of the block 93 with respect to the link member 87. A plate 103 (FIG. 10) affixed to the link member 87 supports a suitably calibrated measuring bar 105 that extends through the block 93 to facilitate setting the tilt of the grinder arm 28. The tilt of the grinder arm 28 can thus be preset to a desired value in accordance with the grind requirements of different sized tires.

The mounting arm 86 (FIG. 2) is pivotable with respect to a fixed machine post 96 about a pivot rod 98. Since the grinder arm 28 is connected to the mounting arm 86 between the ears 78, 80, 82 and 84, the grinder arm 28 also pivots with the mounting arm 86 about the pivot rod 98. Pivotal movement of the grinder arm 28 and the mounting arm 86 about the pivot rod 98 is controlled by a hydraulic cylinder 107. The hydraulic cylinder 107 is pivotally supported on the frame 12 (FIG. 1) and has a piston rod 109 that is pivotally secured about a pivot 111 (FIG. 2) to an ear 113 fixed to and projecting from the second collar portion 94 of the mounting arm 86.

Referring to FIGS. 2 and 4, an elongated bracket or holding channel 100 is welded or otherwise secured to the machine post 96. A mounting clevis 102 having upper and lower legs 106 and 106a, the upper leg 106 of which has rigidly fixed thereto an angularly offset slotted ear 104, is slidably confined in the elongated holding channel 100. The pivot rod 98 is threadably received in the legs 106 and 106a, and is also received in a mounting bracket 108 fastened by fasteners 110 to one end of the holding channel 100. The rod 98 is rotatable, but nondisplaceable, with respect to the mounting bracket 108. A control handle 112 (FIG. 4), affixed to one end of the rod 98 to cause upward or downward movement of the clevis 102 and consequential upward or downward movement of the mounting arm 86 and the grinder arm 28. The clevis 102 is locked into its adjusted position by a locking arm 115 (FIG. 2) that threads into the channel 100.

Referring to FIG. 2, pivotal movement of the grinder housing 26 with respect to the grinder arm 28 is controlled by an attitude adjustment linkage means 142 that connects to the grinder housing 26 and the mounting clevis 102. The attitude adjustment linkage means 142 is operable when the mounting arm 86 pivots about the pivot rod 98 due to protraction or retraction of the piston rod 109 by the hydraulic cylinder 107 to cause movement of the grinder arm 28.

Referring to FIGS. 2-4 and 11-13, the attitude adjustment linkage means 142 comprises a link member 144 having one end pivoted to a clevis 146 extending from the grinder housing 26, and an opposite end pivoted at 147 to an angle-shaped link or crank 148. The angle-shaped link 148 includes length adjustment means 150 for lengthening or shortening the link 148. If desired, length adjustment means similar to the length adjustment means 150 can be incorporated in the link member 144.

A vertex portion 152 of the angle-shaped link 148 is pivoted at 154 to the grinder arm 28. A leg 156 of the angle-shaped link 148 is provided with a rod-like extension 156a which is axially slidable relative to a spherical pivot member 158 that is oscillatable in a block 160. The block 160 is fastened to one end of a rod 162 slidably movable in the sleeve 88 on bushings such as 164 (FIG. 12) pressed into opposite ends of the sleeve 88. An eyelet 166 (FIG. 11), formed at an opposite end of the rod 162 from block 160, receives a fastener 168 that engages a slide 170 to pivotally secure the rod 162 to a link 174.

The slide 170 is slidably displaceable in a slot 172 at one end portion of the link 174 and includes a threaded aperture 171 (FIG. 12) therein. The opposite end of the link 174 is pivoted at 175 to the slotted ear 104 of the mounting clevis 102 which holds the mounting arm 86. A circular nut 176 having adjustment openings 177 therein secures the slide 170 to the link 174, yet permits precisely controlled relative movement between the slide 170 and the link 174 when the nut 176 is loosened. Such relative movement is obtained when an adjustable knob 178, which is pinned by a pin 179 and openings 179a and 179b to a threaded adjustment screw 180, is turned to cause threading of the threaded adjustment screw 180 in the threaded aperture 171 of slide 170. The adjustment provisions on the attitude adjustment linkage 142 permit accurate predetermination of the position of the grinder housing 26 relative to the tire 16 for tires of various sizes.

Thus, upon a protraction or retraction of the cylinder rod 109 (FIG. 2) by the hydraulic cylinder 107, the grinder arm 28 pivots about the pivot shaft 98 with the mounting arm 86. Prior to such pivotal movement the slide 170 is at a selected radial distance from the pivot shaft 98. Since the link 174, on which slide 170 is mounted, is pivoted at 175 to the slotted ear 104, which is fixed, the slide 170 is held at a fixed distance from the pivot 175 while it moves about the pivot rod 98. Consequently, the slide 170 will actually travel on a non-circular path relative to the pivot rod 98 causing the rod 162 to slidably displace in the sleeve 88. Slidable displacement of the rod 162 in the sleeve 88 will therefore always accompany pivotal movement of the grinder arm 28 and mounting arm 86 about the pivot rod 98.

The slidable displacement of the rod 162 in the sleeve 88 will cause the angle-shaped link 148 to pivot about the pivot 154, which in turn causes essentially axial movement of the link 144. The axial movement of link 144 causes the grinder housing 26 to pivot about the shaft 30 while the grinder arm 28 pivots about the pivot rod 98. As a result of this complex movement, the center of the grinder housing 26 (the pivot shaft 30) and the grinder wheels 32 and 34 move along predetermined paths such that, in a plane that is perpendicular to the rotational axis of the tire and intersects the rotational axes of the grinder wheels 32 and 34, the distances between the rotational axis of the tire and each of the intersection points of the grinder wheel axes with such plane will be substantially equal to one another at all times during movement of the grinder wheels 32 and 34 towards and away from the axis of the tire. This assures that the grinders 32 and 34 make simultaneous initial contact with the tire 16 at the start of the grinding operation and that they move radially into the tire in equal amounts during the remainder of the grinding operation.

Referring to FIGS. 3 and 4, the upper grinder arm 72 is likewise formed with a first pair of spaced ears 114 and 116 and a second pair of spaced ears 118 and 120, corresponding to the ears 78, 80, and 82, 84 of the lower grinder arm 28, for connecting the upper grinder arm 72 with a mounting arm 122 that is symmetrical to and operationally identical to the mounting arm 86. The grinder arm 72 thus pivots with respect to the mounting arm 122 along an axis passing through the ears 114, 116, 118 and 120, which axis is defined in part by a pivot sleeve 124 arranged between the ears 114 and 116. A first collar portion 126 of the mounting arm 122, corresponding to the collar portion 92 of the mounting arm 86, embraces the pivot sleeve 124. A second collar portion of the mounting arm 122, although not shown, corresponds to the second collar portion 94 (FIG. 2) of the mounting arm 86.

Pivotal movement of the grinder arm 72 relative to the mounting arm 122 is controlled by a tilt adjuster means 121 (FIGS. 4 and 7) symmetrical to and operationally identical to the tilt adjuster means 85 for the grinder arm 28. The tilt adjuster means 121 for the grinder arm 72, includes a threaded link member 123 having a clevis end portion 125 pivoted to a web 127 formed on the grinder arm 72.

The link member 123 passes through a block 129 pivoted to a clevis 131 on a projection 133 extending from the first collar portion 126 of the mounting arm 122. A control handle 135 threaded onto an end of the link member 123 and axially coupled to and rotatable relative to the block 129 controls the distance between the block 129 and the grinder arm 72. A lock knob 137 which is threaded into the block 129 can be rotated to bear against the link member 123 to lock the position of the block 129 with respect to the link member 123. A plate 139 affixed to the link member 123 supports a calibrated measuring bar 141 (FIG. 7) corresponding to the measuring bar 105 (FIG. 10) that extends through the block 93.

Referring to FIG. 4, the mounting arm 122 is pivotable with respect to the machine post 96 about a pivot rod 128 that corresponds to the pivot rod 98 of the mounting arm 86. The pivot rod 128 is threadably received in a mounting clevis 134 having lower and upper legs 132 and 132a, respectively, the lower leg 132 of which has rigidly fixed thereto an angularly offset slotted ear 130. The clevis 134 is slidably confined in the channel 100. The rod 128 is rotatable but non-displaceable with respect to a mounting bracket 136 which is fastened by fasteners 138 to an end of the channel 100 opposite the mounting bracket 108. A control handle 140 affixed to an end of the rod 128 at the top of mounting bracket 136 may be used to rotate the rod 128 to cause upward or downward movement of the clevis 134 and consequential upward or downward movement of the mounting arm 122 and the grinder arm 72. The mounting clevis 134 is locked into its adjusted position in channel 100 by a locking arm (not shown) which corresponds to the locking arm 115 (FIG. 2) employed to lock lower mounting clevis 102 into its adjusted position relative to channel 100.

Referring to FIG. 3, an attitude adjustment linkage 182, symmetrical to the attitude adjustment linkage 142, connects the upper grinder housing 66 and the upper mounting clevis 134. The attitude adjustment linkage 182 includes a link member 184 connected at one end to the grinder housing 66 and at the opposite end to an adjustable angle-shaped link member 186. The angle-shaped link member 186 is pivoted at 188 to the grinder arm 72 and has a leg portion 190 pivoted at and axially slidable in a block 192. A rod 194 connected to the block 192 is slidable in the sleeve 124 and connects to a slide 195 that corresponds to the slide 170 for the grinder arm 28. A link 196, corresponding to the link 174, has one end that connects with the slide 195 and another end that connects with the slotted ear 130 of the clevis 134. Operation of the attitude adjustment linkage means 182 is identical to that previously described for the attitude adjustment linkage means 142.

A hydraulic cylinder 198 (FIGS. 7 and 9) having a piston rod 200 causes movement of the grinder arm 72 and the mounting arm 122 in a manner similar to that described for the grinder arm 28 and the mounting arm 86.

In operation of the TUO apparatus 10 (FIG. 1), a tire 16 is transported on a conveyor belt 14 to a position below the spindle mount 24 (FIG. 8). The description of the grinding operation will be confined to the portion 18a of the grinder assembly 18 which grinds the lower shoulder of the tire 16, it being understood that the portion 18b of the grinder assembly 18 which grinds the upper shoulder is operationally identical to that of the lower shoulder grinding assembly. The electronic controls for such grinding activity will be described after a description of the mechanical operation.

Referring to FIGS. 1, 8 and 9, prior to the grinding operation and upon arrival of a tire 16 at the TUO apparatus 10, the piston rod 109 of the hydraulic cylinder 107 is in a retracted position and the grinder housing 26 is away from the tire 16. The tire support 22 then raises the tire toward the spindle mount 24 which mount also inflates the tire 16. The spindle mount 24, the tire support 22 and the tire 16 rotate about an axis 201 at approximately 60 rpm under a load imposed by the load wheel 20, and measurements relating to tire uniformity are made in accordance with procedures well known in the art. If the tire measurements are in an acceptable range, no grinding will occur. The tire will be deflated and returned to the conveyor 14 and another tire will be tested for uniformity in a similar manner.

If the tire uniformity measurements are in a non-acceptable range, the hydraulic cylinder 107 will protract the piston rod 109 to pivot the grinder arm 28 and the mounting arm 86 in a clockwise direction, as viewed in FIG. 1, toward the tire 16. During such pivotal movement, the grinder housing 26 moves along a predetermined radial path, defined by the attitude adjustment means 142, toward the tire axis. It is especially important that the grinder housing 26 move along such a radial path in order to enable each of the grinding wheels 32 and 34, which rotate at approximately 6000 rpm, to engage the tire shoulder simultaneously. This simultaneous engagement will permit equal grinding by each of the grinding wheels 32 and 34.

The radial path of movement of the grinder housing 26 is established by (1) the fixed, predetermined distance between the rotational axis 201 of the tire and the axis of the pivot shaft 98 of mounting arm 86, (2) the fixed, predetermined distance between the axis of the pivot shaft 98 and the pivot axis (shaft 30) of the grinder housing 26, and (3) the settings of the various adjustable elements (e.g., slide 170 relative to link 174, and length adjustment means 150 relative to link 148) of the attitude adjustment linkage means 142. As is apparent from an inspection of FIG. 2, the attitude adjustment means 142 causes the grinder housing 126 to pivot in a clockwise direction with respect to the grinder arm 28 when the grinder arm 28 is being pivoted in a counterclockwise direction about the pivot rod 98, and vice versa. This skewing motion of the grinder housing 26 during pivoting movement of grinder arm 28 with respect to pivot rod 98 causes the grinder housing 26 to either approach or recede from the tire 16 while maintaining a radial alignment with the axis 201 of the tire. The adjustable elements (slide 170 and length adjustment means 150) permit sufficient dimensional variation of the attitude adjustment means 142 to adapt such radial movement of the grinder housing 26 to a diverse range of tire sizes.

Variations in shoulder to shoulder dimensions of different tire sizes are dealt with using the adjustment features provided by the control handles 112 and 140 (FIG. 4), which permit a change in distance between the grinder arms 28 and 72. Similarly, variations in the grinding axes of the grind wheels, necessitated by variations in curvature of the tread cross-sections at the tread shoulders, are accomplished by changing the tilt angle of the grinder arm via the tilt adjuster means 85 and 121.

Figure 21:
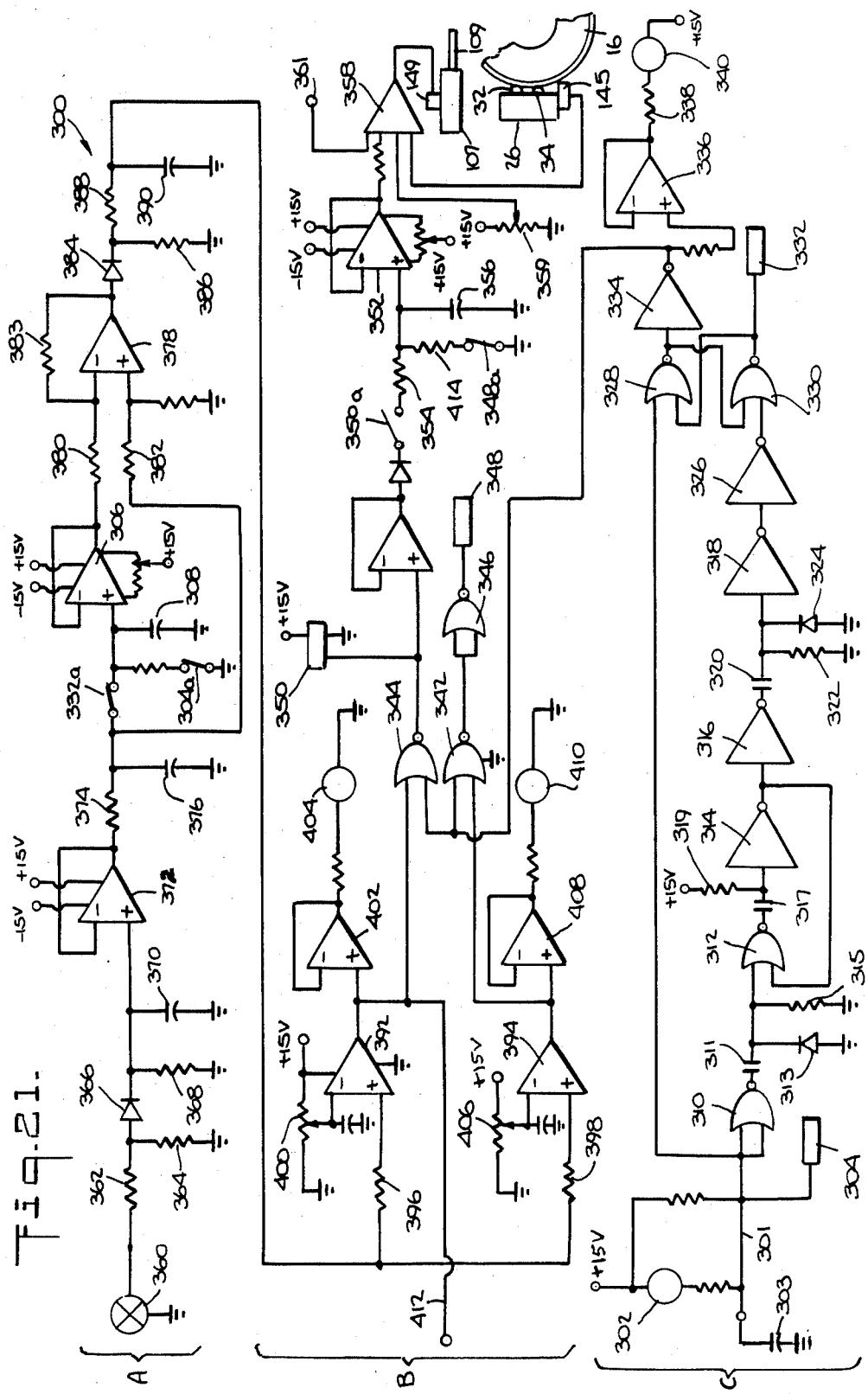
FIG. 21 is a simplified schematic representation of the grinder control circuit for the tire uniformity optimizer apparatus; and, FIG. 22 is a simplified schematic representation of an alarm circuit for the tire uniformity optimizer apparatus.

The amount and extent of grinding done by the grinding wheels 32 and 34 is governed by a grinder control circuit 300, illustrated in FIG. 21, having three branches generally indicated by the letters A, B and C.

Figure 20:
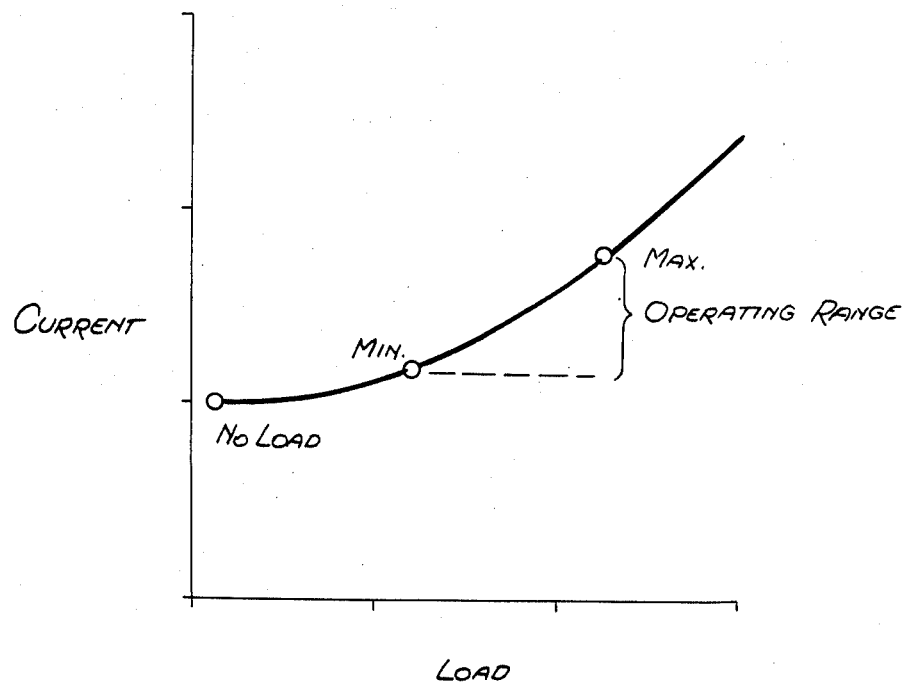
FIG. 20 is a graph showing the relationship between the current drawn by the grinding motor and the load imposed on the grinding motor.

Before beginning a detailed discussion of the grinder control circuit 300, it should be noted that the grinder motors 62 and 74 (FIG. 3) are designed to run at substantially constant speed. Therefore, their no-load currents will differ from the currents that are drawn when the motors are under load. Accordingly, the currents drawn by the motors 62 are indicative of the loads that are on the motors 62 and 74. This current-load relationship, graphically shown in FIG. 20, is employed in the operation of the grinder control circuit 300.

It should also be noted that the TUO apparatus 10 includes conventional known electrical and hydraulic circuits that position the tire in the apparatus, inflate the tire, rotate the tire and measure the uniformity of the tire. These known circuits will not be discussed herein other than to point out necessary interfaces between such circuits and the grinder control circuit 300 (FIG. 21) and the alarm system circuit 500 (FIG. 22) of the present invention.

Considering the lower grind assembly 18a first, the grinder control circuit 300 for this assembly comes into operation when the grinding wheels 32 and 34 of grinder assembly 26 reach a point about ⅛ to 1/16 of an inch away from the tire 16 under the control and direction of the known TUO apparatus circuits. At this time, the sensing shoe 145 (FIG. 2) of a sensor 143 engages the tire 16, causing a relay in the known TUO apparatus circuit to energize and close its contacts 303 (FIG. 21) in line 301 of branch C. This initiates operation, or qualifies, the grinder control circuit 300. The actuation of sensing shoe 145 also causes the known TUO apparatus circuits to transfer control over the movement of the grind assembly 18a toward the tire from those circuits to the grinder control circuit 300.

The closing of relay contacts 303 in line 301 initiates a number of avtivities in the grinder control circuit 300, including (1) the lighting of an indicating lamp to signify that the grinders have reached a point closely adjacent to the tire, (2) the starting of a 2 to 3 second timed period and (3) the storing of the no-load current level of the lower grinder motor during this timed period, in the following manner. The closing of relay contacts 303, grounds line 301, energizing lamp 302, qualifying NOR gate 310 and energizing switch 304, whose normally closed contacts 304a in branch A open to allow a storage amplifier 306 on branch A to store an electrical representation of the no-load current of the grinder motor 62 in a capacitor 308 on branch A. This no-load motor current will be a reference from which the grinder motor current load will be controlled.

NOR gates 310 and 312 and inverter 314, all in branch C, and the components associated therewith, comprise the timing circuit which establishes the predetermined time period, such as 2 or 3 seconds, during which the no-load motor current is scanned in branch A. The capacitor 311, the diode 313 and the resistor 315 AC couple the signal from the NOR gate 310 to the NOR gate 312. The capacitor 317 and the resistor 319 make up the time constant for a timing circuit comprising the NOR gate 312 and the inverter 314. As soon as this timing circuit times out, an inverter 316 in branch C is triggered to permit passage of an AC pulse to the inverter 318 in branch C via an AC coupling represented by a capacitor 320, a resistor 322 and a diode 324.

An inverter 326 inverts or buffers the signal from the inverter 318 and sends a pulse into NOR gate 330 which, together with NOR gate 328, is arranged as a flip-flop circuit. The outputs of the flip-flop circuit 328, 330 change state when the timing circuit 312 and 314 in branch C times out, and these signals are employed to initiate the next series of actions in the grinder control circuit 300, including (1) the lighting of an indicating lamp to signify the ending of the 2 to 3 second timed period and that the no-load motor current is stored, (2) the discontinuing of the no-load motor current signal input to the storage capacitor 308 of storage amplifier 306 in branch A and (3) the enabling of ramp amplifier circuitry in branch B preparatory to re-instituting movement of the grinder wheels into contact with the tire, in the following manner.

When the flip-flop 328, 330 switches state, the output of its NOR gate 330 goes to "0", or ground. This causes switch 332 in branch C to energize, opening its normally closed contacts 332a in branch A and thereby terminating the no-load motor current input to storage capacitor 308 of storage amplifier 306. The output of NOR gate 328, on the other hand, goes to "1", and this signal is passed to an inverter 334 in branch C which inverts the signal, providing a "0", or ground, input to a buffer amplifier 336 which grounds resistor 338, causing lamp 340 to light. The light 340 thus provides a visual indication that the no-load motor current has been stored by the storage amplifier 306 in branch A.

The "0" signal provided by the inverter 334 in branch C is also used to qualify NOR gate 342 and 344 in branch B. Thus, the signal sent to NOR gate 342 normally passes through NOR gate 342 and qualifies a NOR gate 346 in branch B to activate switch 348, whose normally closed contacts 348a in branch B open. Similarly, the signal sent to NOR gate 344 in branch B normally passes through the NOR gate 344, actuating switch 350, whose normally closed contacts 350a in branch B close. Contacts 348a and 350a are part of a charging circuit for the input capacitor 356 of a ramping amplifier 352 in branch B. When the contacts 348a are in their normally closed position, they discharge capacitor 356 and hold the output of the amplifier 352 at ground level. When the contacts 348a open and the contacts 350a close, the capacitor 356 and the amplifier 352 are ready to accept information. Thus, when a signal is passed into the RC network composed of resistor 354 in branch B and capacitor 356 in branch B, the capacitor 356 will charge at a predetermined rate. As that charge is seen on the input of the ramping amplifier 352 in branch B, the output of the ramping amplifier 352 will follow the level of charge in the capacitor. For example, the output of the ramping amplifier 352 is fed into a servo-amplifier 358 in branch B. The servo-amplifier 358 operates a servo-valve 149 that causes the hydraulic cylinder 107 and piston rod 109 to advance the grinder housing 26 toward the tire 16.

The servo-amplifier 358 has several inputs, including a manual skim adjust control 359 and a force variation control signal 361, the latter of which is controlled by the known TUO machine circuitry and determines whether only one or more portions of, or the entire circumference of, the tire shoulder is to be ground. Another input is from the sensor shoe 145 of the sensor 143 on the grinder housing 26. When the grinder housing 26 is to be advanced towards the tire 16, the control signal must be at a predetermined level. As the grinder housing 26 moves toward the tire 16, the sensor shoe 145 on the grinder housing 26 will contact the tire 16 and become depressed before the grinding wheels 32 and 34 engage the tire. As the sensor shoe 145 is depressed it sends a signal to the servo-amplifier 358 to stop activation of the servo-valve 149, which stops the piston rod 109 of the hydraulic cylinder 107 from causing further advance of the grinder housing 26 toward the tire 16. Preferably, this stop action is arranged to occur when the grinding wheels 32 and 34 are approximately 1/16th of an inch away from the tire 16.

As indicated above, after the grinder housing 26 is prepositioned to its close proximity point to the tire 16 and after the no-load current signal is stored, a ramping signal is sent into the ramping amplifier 352 which passes this signal to the servo-amplifier 358. The output signal from the servo-amplifier 358 is a ramp voltage that starts at 0 volts and rises exponentially since the ramping amplifier 352 is being fed by the capacitor 356. The servo-amplifier 358, fed by the ramping amplifier 352, thus causes the grinders 32 and 34 to move toward and to engage the tire under precisely controlled conditions.

As the grinders 32 and 34 start to come into contact with the tire 16, the motor current of the grinder motor 62 will start to increase from its no- load level. The motor current is sensed in a current transformer 360 in branch A, and passes through resistors 362 and 364 and through a diode 366, which provides half-wave rectification. The motor current signal then goes through a filter circuit, represented by the resistor 368 and the capacitor 370, prior to passing into a buffer amplifier 372. The output from the buffer amplifier 372 is filtered by a resistor 374 and a capacitor 376.

The output from the buffer amplifier 372 does not go into the storage amplifier 306, which has the no-load current value stored therein, because the switch contacts 332a are open. Therefore, such output goes around the amplifier 306 as an input to an amplifier 378 in branch A which has a gain of approximately 20 to 1, based on the sizes of the resistors 380, 382 and 383. The amplifier 378 is a differential summing amplifier that sums the inverted value of the stored no-load motor current and the non-inverted value of the incoming loaded motor current during the grinding operation, and provides an output that is representative of the load on the motor.

As indicated earlier, the grinder motor current increases from its no-load level when the grinders 32 and 34 contact the tire. The resulting output from the amplifier 378 is representative of the new motor current developed as load is placed on the grinders 32 and 34. The output from the amplifier 378 goes through a diode 384 and a filter network composed of a resistor 386, a resistor 388 and a capacitor 390. The diode 384 functions as a one-way valve to allow current to flow in a positive direction, but to prevent the sensing of sudden drops in motor current below the no-load current reference level in the storage amplifier 306. For example, when a load is placed on the grinders 32 and 34, and the load suddenly diminishes, possibly because the tire is out of round or may have a flat spot, the motor 62 may temporarily overspeed resulting in a low instantaneous current. This low instantaneous current need not be sensed and is not sensed because of the diode 384.

The output signal from filter network 386, 388 and 390 is then fed into a minimum grind comparator 392 and a maximum grind comparator 394 in branch B through respective resistors 396 and 398. As will appear in greater detail in the following discussion, the minimum grind comparator 392 is preset to trip and provide a signal to the input of ramping amplifier 352 to stop advancing the grinder housing 26 toward the tire 16 when the grinder motor current reaches a specified minimum level. The level at which the minimum grind comparator 392 trips is established by the setting of a potentiometer 400 the output of which is connected as one of the inputs to comparator 392. The minimum grind comparator 392 thus senses a current level at which grinding is desired and until such current level is sensed the grinders 32 and 34 will advance against the tire 16. Any time the minimum grind comparator 392 is tripped, the grinders 32 and 34 will stop advancing and grinding will take place at the point at which the minimum grind comparator has been tripped. When the grind current drops below the setting of the minimum grind comparator, the grinders 32 and 34 will again start to advance against the tire 16.

Considering the minimum grind comparator circuitry in greater detail now, as grinding occurs upon initial movement of the grinding wheels into contact with the tire the motor current will increase because the load on the grinding wheels 32 and 34 increases. If the load increases to the level that is predetermined by the setting of potentiometer 400 at the input side of the minimum grind comparator 392, the minimum grind amplifier 392 will trip, sending a signal through a buffer amplifier 402 in branch B that causes a light 404 to illuminate, providing a visual indication that the minimum grind comparator 392 has been tripped.

When the minimum grind comparator 392 trips, an output signal also goes into the NOR gate 344 in branch B that de-actuates the previously actuated switch 350. Accordingly, the normally open switch contacts 350a now open and the charging of the capacitor 356 in branch B is stopped. Thus, when the minimum grind comparator level at the comparator 392 is exceeded, charging of the capacitor 356 terminates and the ramping amplifier 352 will send out a constant signal based on the state of the charge of the capacitor 356.

As the grinder motor current begins to drop because rubber is being ground away from the tire 16, the signal level at the resistor 396 input to the minimum grind comparator 392 will drop until a point is reached at which the comparator 392 resets, causing light 404 to go out and switch 350 to re-actuate. Contacts 350a thus close and allow the ramping capacitor 356 to continue to charge until such time as the minimum grind comparator 392 is again tripped. It should be noted that as the ramping capacitor 356 again charges, the grinders 32 and 34 again begin to advance against the tire 16, causing a buildup of grinding pressure and grinder motor current.

It should also be noted that the output signal from the minimum grind comparator 392, in addition to being fed into the NOR gate 344 in branch B, is brought out to a terminal at line 412 for use in the alarm system circuit of FIG. 22, as will be further described hereinafter.

If the grinders 32 and 34 advance against the tire 16 by an amount that causes the current of the grinder motor 62 to reach a predetermined maximum level, the maximum grind comparator 394 in branch B will trip. The predetermined maximum current level is represented by the setting of a potentiometer 406 at the input side of the maximum grind comparator 394. When the maximum grind comparator 394 trips, it sends an output signal through a buffer amplifier 408 in branch B which causes a light 410 to illuminate, thereby providing a visual indication that the maximum grind comparator 394 has been tripped.

The output signal from the maximum grind comparator 394 also passes into the NOR gate 342 in branch B, causing its output to switch. This causes the output of NOR gate 346 in branch B to switch, resulting in the de-actuation of previously actuated switch 348. When the switch 348 de-actuates, its normally closed contacts 348a close, providing a discharge path for the capacitor 356 through the resistor 414 in branch B. As the capacitor 356 discharges the ramp voltage will decay or drop back, causing the servo-amplifier 358 output to drop. As a result of this, the servo-valve 149 moves in a direction that causes the piston rod 109 of the hydraulic cylinder 107 to retract the grinder housing 26 from the tire 16. The grinder housing 26 will thus retract until the motor current as sensed at the maximum grind comparator 394 drops below the predetermined level that caused the maximum grind comparator 394 to trip.

Once the grinder motor load current falls below the predetermined level, the maximum grind comparator 394 resets, thereby causing the switch 348 to re-energize. Accordingly, its contacts 348a open, removing the discharge circuit for the ramping capacitor 356. The ramp voltage output of the ramping amplifier 352 then remains at a level corresponding to the level of charge on the capacitor 356 when the discharge circuit of that capacitor opened.

Grinding of the tire 16 thus takes place when the grinder motor current is within the minimum and maximum levels predetermined by the minimum grind comparator 392 and maximum grind comparator 394. During grinding the grinder motor current will decrease as tire material is removed by the grinders 32 and 34. Eventually the grinder motor current drops below the minimum grind level causing the minimum grind comparator 392 to trip. The grind cycle will thus repeat again and again as long as the grind control signal represented by closed contacts 303 in line 301 of branch C is present. Thus, the grinder housing 26 will either be caused to advance against or retract from the tire 16 in the manner previously described, depending upon whether the minimum grind comparator 392 or the maximum grind comparator 394 is tripped. If neither comparator is tripped, the grinder housing 26 remains at the position it last occupied when one or the other of the comparators was reset.

When the tire 16 has been sufficiently ground to comply with tire uniformity requirements, the closed contacts 303 in line 301 of branch C will open, terminating the input signal to the grinder control circuits 300. The controls in the TUO machines used for detecting that a tire has been sufficiently ground to comply with tire uniformity requirements and for opening the contacts 303 to indicate a completion of grind condition are well known in the art and need not be detailed herein.

When the input signal contacts 303 open, line 301 of branch C will go from a "0", or ground condition, to a "1" condition, causing the switch 304 in branch C to de-energize and causing its contacts 304a in branch A to close. This provides a discharge path for the stored no-load current circuit of the capacitor 308 in branch A. The inputs for the NOR gate 310 and the flip-flops 328, 330 in branch C will also switch, resetting the flip-flops and causing the switch 332 in branch C to de-energize and its contacts 332a in branch A to close. The resetting of flip-flops 328, 330 and concurrent inversion of the output signal of NOR gate 328 by inverter 334 in branch C will cause lamp 340 to go out and will cause the NOR gate 344 in branch B to de-actuate the switch 350. Accordingly, contacts 350a open the charging circuit to the ramping capacitor 356 of the ramping amplifier 352. The signal from inverter 334 in branch C will also cause the NOR gate 342 in branch B to de-actuate the switch 348, closing its contacts 348a and completing the discharge circuit of the ramping capacitor 356.

Since the grind control circuit 300 of FIG. 21 only controls the grinding of the lower shoulder of the tire 16 by the lower grinding wheels 32 and 34, as viewed in FIG. 4, it should be noted that another grind control circuit (not shown) similar to that of FIG. 21 is used to control the grinding of the upper shoulder of the tire 16 by the upper grinding wheels 68 and 70. Preferably, grinding of the upper and lower shoulders is done simultaneously.

Occasionally, however, the grinding of the upper and lower shoulders of a tire is uneven or unbalanced because the upper shoulder grinder and the lower shoulder grinder do not grind together during some portion of the grind cycle. This situation may be due to a malfunction, such as when one or the other of the upper and lower shoulder grinders fail to move into contact with the tire when the grinding cycle begins, or it might be due to a failure of one or the other of the upper and lower shoulder grinder motors to operate.

Figure 22:
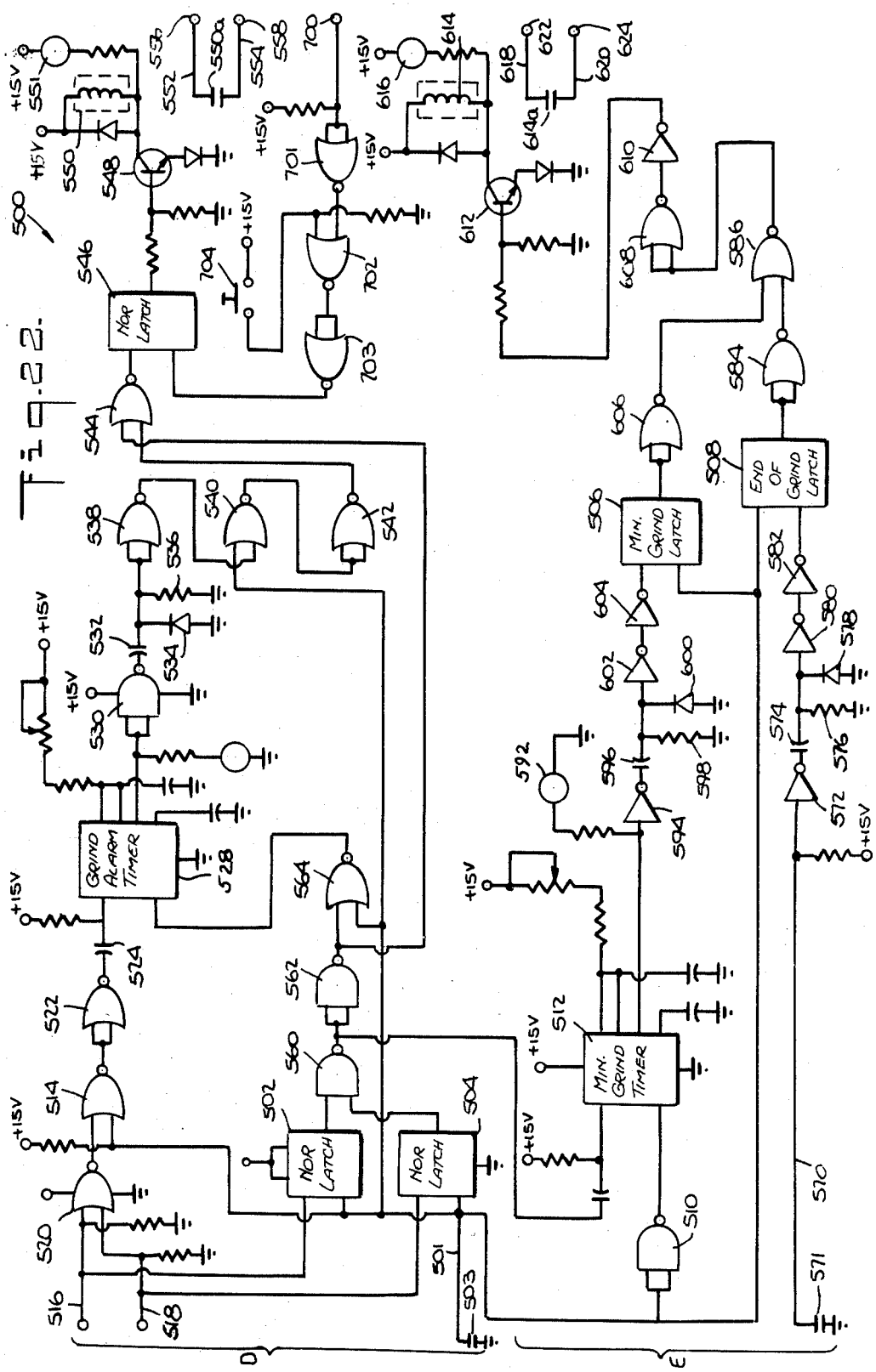

The alarm system or detection circuit 500 of FIG. 22 is used in combination with the lower shoulder grinder control circuit 300 of FIG. 21 and a similar grinder control circuit (not shown) for grinding the upper shoulder of the tire, to detect when each of the upper and lower shoulder grinders contact the tire and start grinding. If one of the shoulder grinders does not contact the tire and begin grinding within a predetermined time, such as two to five seconds after tire contact is made by the other shoulder grinder, the alarm circuit will cause the TUO machine to shut down. The TUO machine will also be shut down if one or the other of the upper and lower shoulder grinders fails to operate. Thus, only one alarm circuit is needed to monitor the grinding operation performed by the upper and lower tire shoulder grinders.

Some tires which require grinding are only slightly out of a predetermined acceptance range. Therefore, the grinding correction called for by the TUO machine may require only a very small duration of grinding time, which can amount to a mere touching of the tire by the grinding wheels. Consequently, the entire periphery of the tire shoulder may not be evenly ground and the surface of the tire at the shoulder area may have noticeable differences in textures or surface finish.

This difference in surface texture at the tire shoulder is undesirable since it may give the tire a blemished appearance. To obviate the problem, it is intended that a grinding cycle, once begun, will have a minimum time duration to assure a uniform grinding finish at the tire shoulders. Therefore, the alarm circuit system 500 of FIG. 22 has provision therein for assuring that when a grind operation is initiated it will have a minimum time duration even if the specification limits which normally govern the grinder control circuit of FIG. 21 are satisfied.

The alarm system circuit 500 of FIG. 22, which has two branches generally indicated by the letters D and E, comes into operation or is qualified at the same time as is the grind control system circuit 300 of FIG. 21. In this case, normally open contacts 503 in line 501 of branch D close when the relay which controls contacts 303 of line 301 of the grind control system 300 becomes energized by the known TUO machine circuits. The closing of contacts 503 grounds line 501 and this serves as the input signal to the alarm system circuits 500. The grounding of line 501 removes the reset signals to NOR latches 502 and 504 in branch D and also removes the reset signals to the minimum-grind NOR latch 506 and the end-of-grind NOR latch 508 in branch E.

The circuit 500, when not in use, is normally in a reset condition. Thus, the ground signal on line 501 of branch D passes through a NAND circuit 510 in branch E and removes the reset signal to a timer 512 in branch E. It also removes the NOR circuit bias on NOR gates 514, 540 and 564 at branch D. The circuit 500 is thus qualified to operate.

When a minimum grind level current is sensed by the minimum grind comparator 392 (FIG. 21) of the grind control circuit 300, the signal is passed through a line 412 in branch B of that circuit to the line 516 at branch D of the alarm system circuit 500 (FIG. 22), the line 516 representing the upper shoulder grinder, for example. A minimum grind level current sensed by the minimum grind comparator 392 for the lower shoulder grinder would be manifested as a signal in the line 518 at branch D of the alarm system circuit 500.

When one of the minimum grind comparator 392 control signals is sensed at line 516 or 518, it will switch the NOR gate 520 in branch D which will switch the NOR gates 514 and 522 in branch D. The capacitor 524 thus AC couples a pulse signal to initiate a grind alarm timer 528 in branch D to start a predetermined time cycle of, for example, two to five seconds.

Assuming that the minimum grind comparator 392 control signal corresponds to the upper shoulder grinder, a sensing of such signal would occur at line 516. The signal at line 516 sets the NOR latch 502 in branch D, which identifies that the upper shoulder grinder is operating. If the lower shoulder grinder fails to make appropriate contact with the tire and does not start grinding before the timer 528 times out, the output of timer 528 will qualify NAND gate 530 in branch D to switch. The capacitor 532, diode 534 and resistor 536 would then AC couple the signal from NAND gate 530 to NOR gate 538, triggering NOR gates 540 and 542 in conjunction with NOR gate 544 to turn on a NOR latch 546 in branch D.

The NOR latch 546, when turned on by the NOR gate 544, qualifies a transistor 548 to turn on a light 551 and to energize an alarm relay 550. The alarm relay 550 is provided with normally open contacts 550a that are interfaced with the TUO machine controls (not shown) to shut the TUO machine down. The contacts 550a of the alarm relay 550 are positioned in lines 552 and 554 which lead to terminals 556 and 558 of a control box (not shown).

After the alarm circuit has been actuated NOR latch 546, transistor 548 and relay 550 will remain in their actuated condition until manually reset. When the malfunction has been corrected, resetting is accomplished, at the machine, by depressing push buttom 704 which qualifies NOR gates 702 and 703, resetting NOR latch 546 and de-actuating relay 550. Remote resetting can be accomplished by grounding the input 700 from a remote location which will switch the output of NOR gate 701, qualifying NOR gates 702 and 703 and resetting the NOR latch 546, again de-actuating relay 550.

Assuming that the minimum grind comparator 392 control signal from the upper shoulder grinder is received first and the minimum grind comparator 392 control signal from the lower shoulder grinder is received at line 518 before the timer 528 in branch D times out, both of the NOR latches 502 and 504 would be set, qualifying NAND circuit 560 in branch D. The output of NAND circuit 560 switches NAND circuit 562, which is used as an inverter, to qualify a NOR circuit 564 which resets or inhibits the timer 528 from continuing its timing cycle. The grinding operation is thus allowed to continue.

In addition to the balance alarm function of the circuit 500 just described, a minimum grind time function is also provided in circuit 500.

The line 570 in branch E receives an end-of-grind signal from the TUO machine to indicate when a tire that is being ground conforms to acceptable uniformity requirements. The end-of-grind signal at line 570 is provided by known TUO machine control circuitry (not shown) which measures the radial force variation of the tire as the tire is being ground, and detects when the tire has been corrected within required specification limits. The end-of-grind signal is manifested by a closing of contacts 571 in line 570, causing line 570 to go to ground.

When the end-of-grind signal is received at line 570, it passes through an inverter amplifier 572 in branch E, is AC coupled by a network including the capacitor 574, the resistor 576 and the diode 578 to a second inverter amplifier 580 for passage to a third inverter amplifier 582. The output signal from the inverter amplifier 582 triggers the end-of-grind NOR latch or latch gate 508 which remains triggered until reset. The output of the latch gate 508 passes to a NOR gate 584 in branch E, which is used as an inverter, to qualify one input of a NOR gate 586 in branch E.

As indicated earlier, when the initiate-grind signal (closing of contacts 503 in line 501 to ground line 501 in branch D) was received, the NAND gate 510 in branch D was used as an inverter to remove the reset signal from the minimum grind timer 512 in branch E. Thereafter, when a balanced grind timer reset signal was generated by the NAND circuit 560 to inhibit the timer 528 in branch D from continuing its timing cycle, that signal was also sent to the minimum grind timer 512 to qualify it to operate. While the minimum grind timer 512 is timing, a light 592 in branch E is illuminated, providing a visual indication that the minimum grind timer 512 is timing. At the end of the minimum grind time, a signal from the minimum grind timer 512 is inverted in a buffer amplifier 594 in branch E. The inverted signal is AC coupled, via a network including a capacitor 596, a resistor 598 and a diode 600, to a buffer amplifier 602 which passes the signal to a buffer amplifier 604 that triggers the minimum grind NOR latch module 506 in branch E.

The output of the minimum grind NOR latch module 506 is fed into a NOR gate 606 which provides the proper signal swing to qualify the NOR gate 586 in branch E. The NOR gate 586 will qualify the minimum grind time signal from the NOR latch 506 with the end-of-grind time signal received from the line 570 to provide an input signal to a NOR gate 608. The NOR gate 608 functions as a buffer amplifier to pass the signal, with proper signal swing, to a buffer amplifier 610.

The output signal from the buffer amplifier 610 qualifies a transistor 612 to energize a relay 614 and a light 616. Actuation of the relay 614 indicates a supplemental end-of-grind signal that satisfies the minimum grind time requirements that have been established regardless of the earlier acceptablity of the tire being ground. Thus, the supplemental minimum grind time signal may be delayed beyond the time that the TUO machine would normally take to generate an end-of-grind time signal at the line 570, and the signal coming from the latch 506 essentially controls the grind time cycle.

The relay 614 includes normally open contacts 614a that connect to lines 618 and 620 which lead to terminals 622 and 624 of a circuit board (not shown). This supplemental minimum grind time signal is incorporated into the control circuitry for the TUO machine at the point where the original end of grind time signal at line 570 would normally end the TUO machine grind cycle.

When the end-of-grind time signal at the line 570 lags the signal coming from the minimum grind latch 506, the signal at line 570 essentially controls the grind time cycle.

Figure 14:
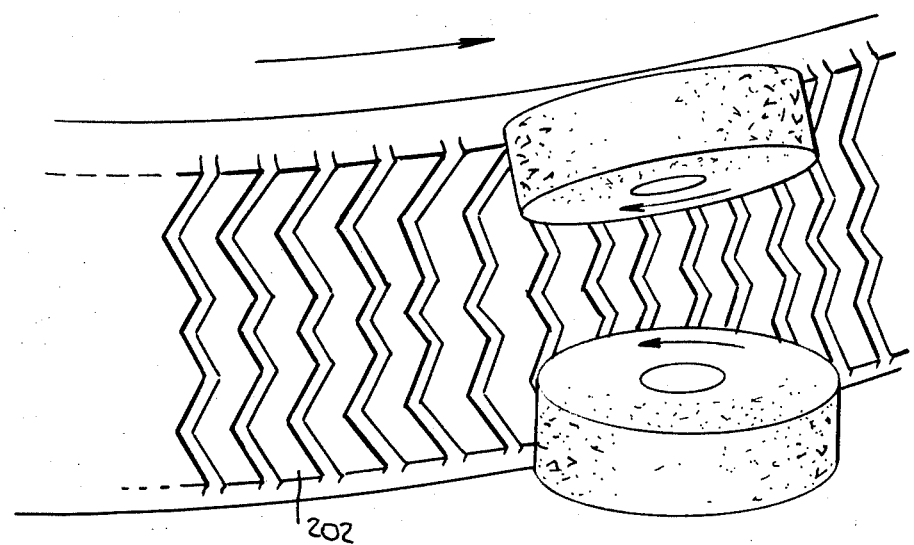
FIGS. 14–16 illustrate the manner in which a tire is provided with a shingled effect on its tread as a result of grinding in one direction only.
Figure 15:
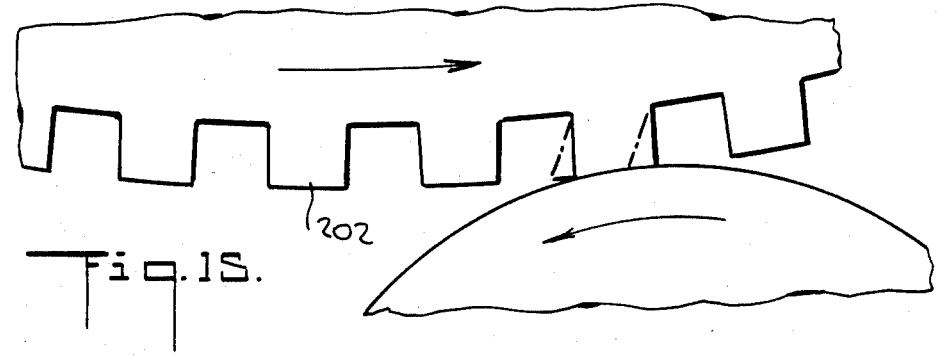
Figure 16:
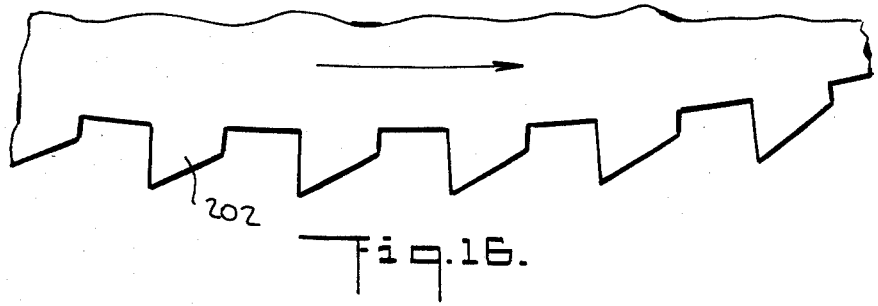

Some advantages of the invention evident from the foregoing description include a correction of tire non-uniformities by contrarotating grinding wheels which assure a uniform grinding of the tread lugs or blocks so as t avoid creating the shingled effect shown in FIG. 16. Single rotational direction grinders, as shown in FIG. 14, will cause the tread lugs 202, as shown in FIG. 15, to shift or buckle in the direction of grind. Consequently, there is an uneven grinding of the tread lug, as shown in FIG. 16, which gives the tread lugs a shingled effect.

Figure 17:
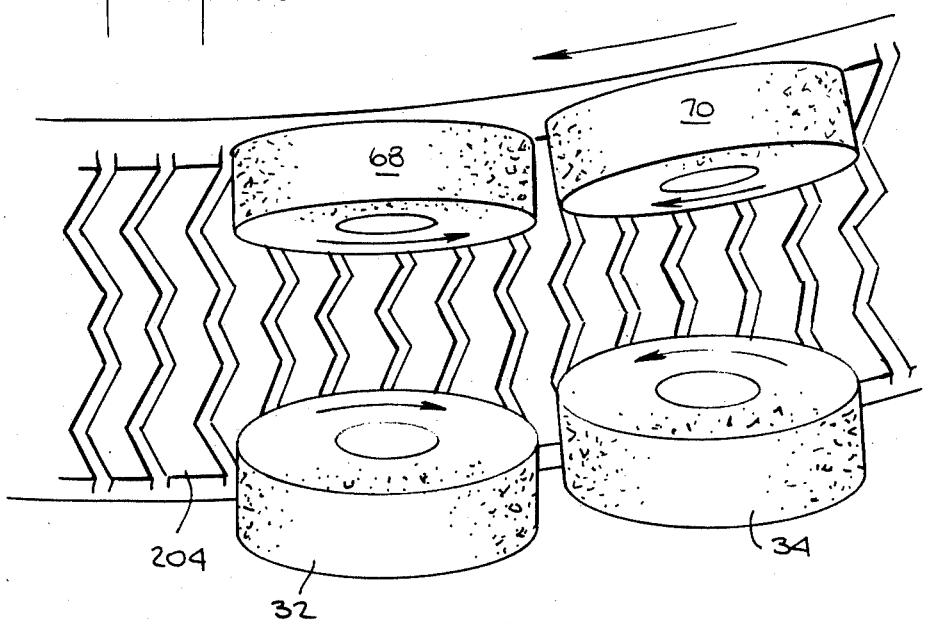
FIGS. 17–19 illustrate the manner in which a tread is ground free of any shingled effect using the contra-rotating grinding wheels of the present invention.
Figure 18:
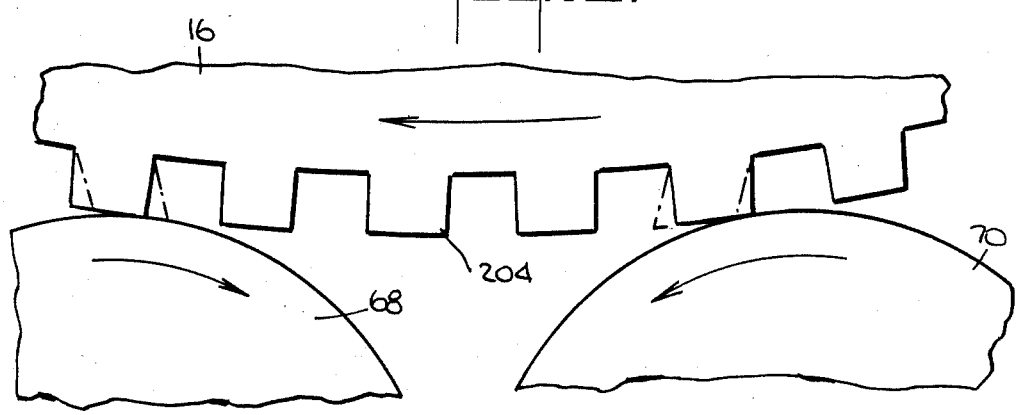
Figure 19:
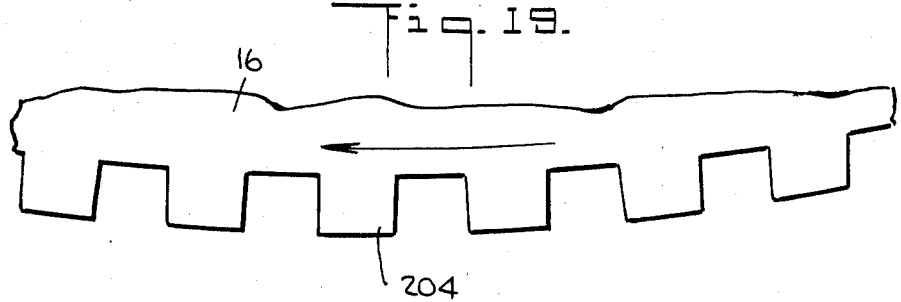

The contra-rotating grinding wheels of the present invention, as schematically shown in FIG. 17, provide a dual grind at each circumferential band of the tire which is ground. Thus, a tread lug 204 of the tire 16 is ground first by the grinder wheel 68 which moves in a clockwise direction, as shown in FIG. 18. The tread lug 204 is then ground by the grinder wheel 70 which moves in a counterclockwise direction. Under this arrangement, the grinding of the tread lugs 204 is substantially uniform and the shingling effect that is characteristic of grinding in one direction only is obviated, as shown in FIG. 19.

Other advantages of the invention include a grind control circuit which controls the force of the grinding wheels against the tire by selectively moving the grinding wheels towards or away from the tire in order to maintain the motor load current of the grinder motor within specified minimum and maximum levels. Under this arrangement the harshness or rate of grind is kept within limits that further assure obviation of the shingling effect of FIG. 16.

Still further advantages of the invention include the alarm circuit which detects whether one of the shoulder grinder assemblies begins grinding engagement with the tire within a predetermined time period after the other shoulder grinder assembly has made grinding engagment with the tire. Otherwise, the grinding operation is shut down to permit an inspection of the grinding apparatus for the source of any faulty operation. The alarm circuit thus assures that the grinding which takes place at both shoulders of the tire is consistent. A further advantage of the invention is that both of the contra-rotating grinding wheels in a grinder housing move along a path defined by the radius of the tire, thereby assuring simultaneous contact of both contra-rotating grinding wheels with the tire. This feature of the invention also helps to obviate the shingled effect of FIG. 16.

Another advantage of the invention is that once a grinding operation has begun, the grinding will have a minimum time duration even though the time required for correction of a tire may be less than the minimum time duration. The alarm circuit which controls this function thus assures that tires which only require small amounts of grinding do not appear blemished because of an erratic grinding pattern that might be characteristic of a small amount of grinding. Thus, a predetermined minimum amount of grinding that will provide a grind band of uniform width around the circumference of the tire will always be provided, without adversely affecting the correction that is to be made to the tire.

Still another advantage of the invention is that the grinding operation will be shut dwn if any of the grinder assemblies malfunctions. Thus, tires which might become rejects because of faulty operation of the TUO machine are substantially eliminated since the TUO machine will not be permitted to operate in a faulty manner by virtue of the alarm circuit controls.

In view of the above it will be seen that the several objects of the invention are achieved and that other advantageous results are attained.

While a particular embodiment of this invention has been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

What is claimed is:

1. Apparatus for removing tire material from a tire having a rotational axis comprising:
   a. means for supporting the tire for rotation about the rotational axis;
   b. means for rotating said tire in a selected direction about the rotational axis;
   c. grinding means constructed and arranged to simultaneously grind substantially equal axial extents of at least two circumferential portions of the tire which are angularly, but not axially, spaced with respect to the rotational axis, said grinding means including
      (i) first and second grinding wheels angularly, but not axially, spaced with respect to the rotational axis, and
      (ii) means for rotating said first and second grinding wheels in opposite directions while the tire is rotated in said selected direction; and
   d. means for moving said first and second grinding wheels from a first position away from said at least two circumferential portions of the tire to a second position of grinding contact against said tire.

2. The apparatus as claimed in claim 1, including means for supporting said first and second grinding wheels at a common first axial position with respect to said rotational axis and at a first common tilt angle position with respect to said rotational axis.

3. The apparatus as claimed in claim 2, including means for adjusting said first common tilt angle position.

4. The apparatus as claimed in claim 1, wherein said means for moving said first and second grinding wheels include means for directing said movement along a radial line of said tire when said first and second grinding wheels are moved from said first position to said second position.

5. The apparatus as claimed in claim 1, wherein said grinding means include a first support means for supporting said first and second grinding wheels at a first axial position with respect to said rotational axis when said first and second grinding wheels are in said second grinding position, said grinding means further including third and fourth grinding wheels and second support means for supporting said third and fourth grinding wheels at a second axial position spaced from said first axial position.

6. The apparatus as claimed in claim 5 wherein said tire has opposite shoulder portions and said first and second axial positions are spaced a predetermined amount to permit said first and second grinding wheels to grind said tire along one of said shoulder portions and to permit said third and fourth grinding wheels to grind said tire along the other of said shoulder portions.

7. The apparatus as claimed in claim 5 including means for adjusting the relative position of said first and second support means to adjust the axial spacing between said first and second axial positions.

8. The apparatus as claimed in claim 6 wherein said grinding means include means for rotating said third and fourth grinding wheels in opposite directions.

9. The apparatus as claimed in claim 5, comprising means for preventing said first and second grinding wheels from grinding said tire if said third and fourth grinding wheels do not come into grinding contact with said tire within a predetermined time after said first and second grinding wheels come into contact with said tire, and vice versa.

10. The apparatus as claimed in claim 5 comprising means for preventing said first and second grinding wheels and said third and fourth grinding wheels from grinding said tire if either said first and second wheels or said third and fourth wheels stop grinding because of a malfunction.

11. The apparatus as claimed in claim 1, wherein the first and second grinding wheels are circumferentially spaced around a common shoulder portion of said tire when said first and second grinding wheels are in said second position.

12. The apparatus as claimed in claim 11, wherein said first and second grinding wheels are at a common tilt angle position with respect to the rotational axis of the tire.

13. The apparatus as claimed in claim 11, wherein the first and second grinding wheels are at substantially the same axial position with respect to said rotational axis when said first and second grinding wheels are in said second position.

14. The apparatus as claimed in claim 1 wherein said first and second grinding wheel moving means includes means for simultaneously moving said first and second grinding wheels into simultaneous contact with said tire.

15. The apparatus as claimed in claim 1, comprising means for maintaining the continuation of a grinding operation for a predetermined minimum time duration once said grinding operation has begun.

* * * * *